United States Patent [19]

Borysiewicz et al.

[11] 4,009,356
[45] Feb. 22, 1977

[54] DATA MODEMS HAVING DATA DROP-OUT AND DATA ECHO PROTECTION

[75] Inventors: Richard Borysiewicz, Miami; Charles W. Roedel, Miami Shores, both of Fla.

[73] Assignee: Milgo Electronic Corporation, Miami, Fla.

[22] Filed: Aug. 1, 1975

[21] Appl. No.: 600,958

Related U.S. Application Data

[62] Division of Ser. No. 438,387, Jan. 31, 1974, abandoned.

[52] U.S. Cl. .......................... 179/170.2; 178/69 G; 179/2 DP; 325/41; 325/323; 325/478
[51] Int. Cl.² .................................. H04L 25/08
[58] Field of Search .............. 178/69 G; 179/170.4, 179/170.2; 340/146.1 C, 146.1 E; 325/2, 41, 64, 323, 348, 478

[56] References Cited

UNITED STATES PATENTS

| | | | |
|---|---|---|---|
| 2,248,746 | 7/1941 | Davis | 179/170.4 |
| 3,711,777 | 1/1973 | Tink | 325/64 |
| 3,755,744 | 8/1973 | Fukata | 325/478 |

*Primary Examiner*—David L. Stewart
*Attorney, Agent, or Firm*—Jackson & Jones Law Corporation

[57] ABSTRACT

Disclosed is an automatic data communication system having communicating modems equipped with automatic equalizers. The equalizers respond to a first long equalization sequence automatically transmitted from another modem. In response to that long equalization sequence, the equalizer starts from a preset non-equalized condition and assumes a fully equalized condition. That equalized modem is also capable of automatically transmitting its own long equalization sequence to the other modem. Thereafter, second short equalization sequences are employed at the receiving modems to enable a memory storage associated with the automatic equalizers. The memory stores, in response to the long equalization sequence, signals which are indicative of the fully equalized condition. Accordingly, the equalizers do not have to start from a non-equalized condition for each new data message unless a dramatic distortion occurs. If such distortion does occur, it is automatically detected and long equalization sequences are again employed to fully re-equalize. The disclosed modems have detection means for automatically distinguishing between equalization sequences, line drop-outs, and data echoes.

7 Claims, 15 Drawing Figures

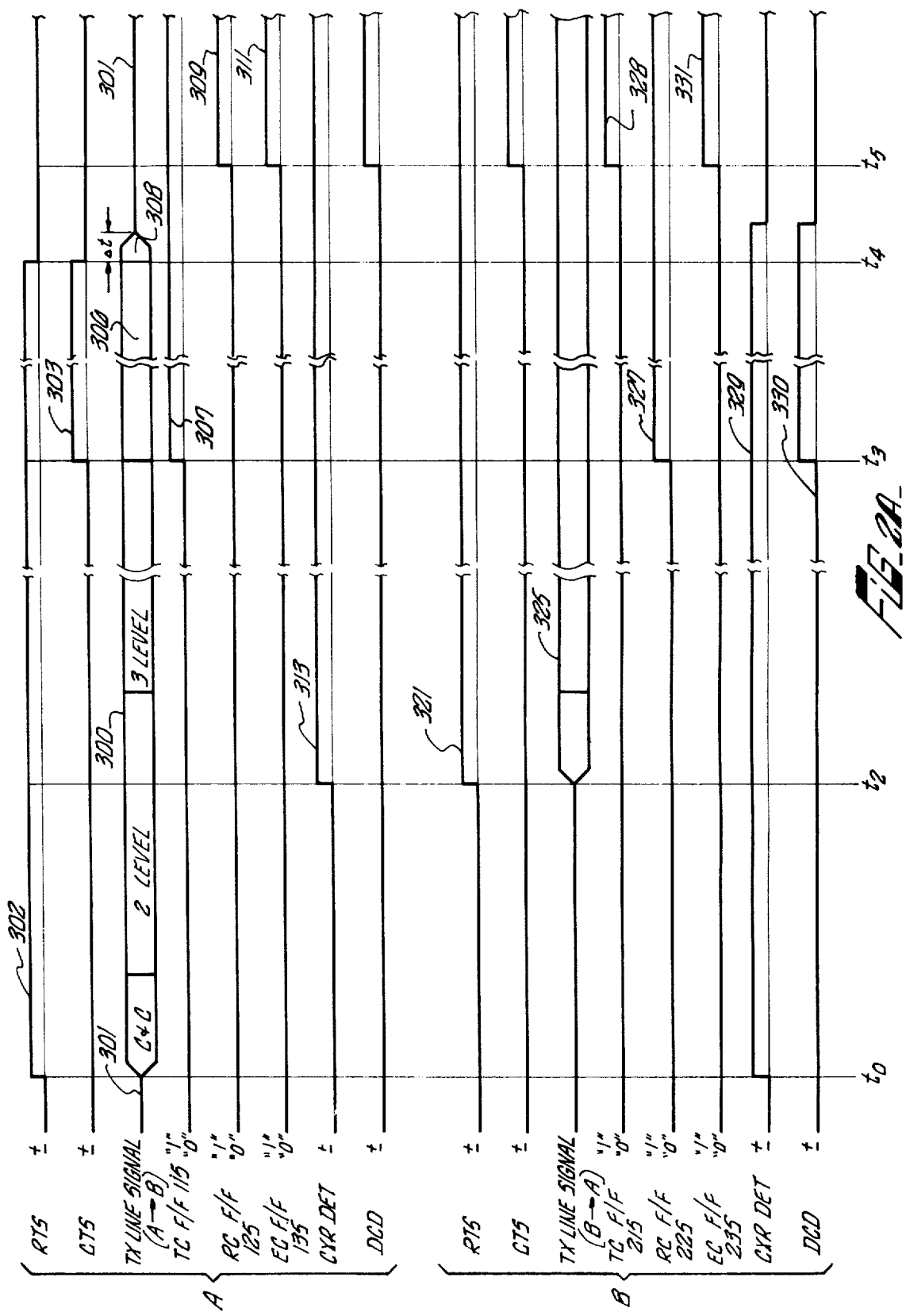

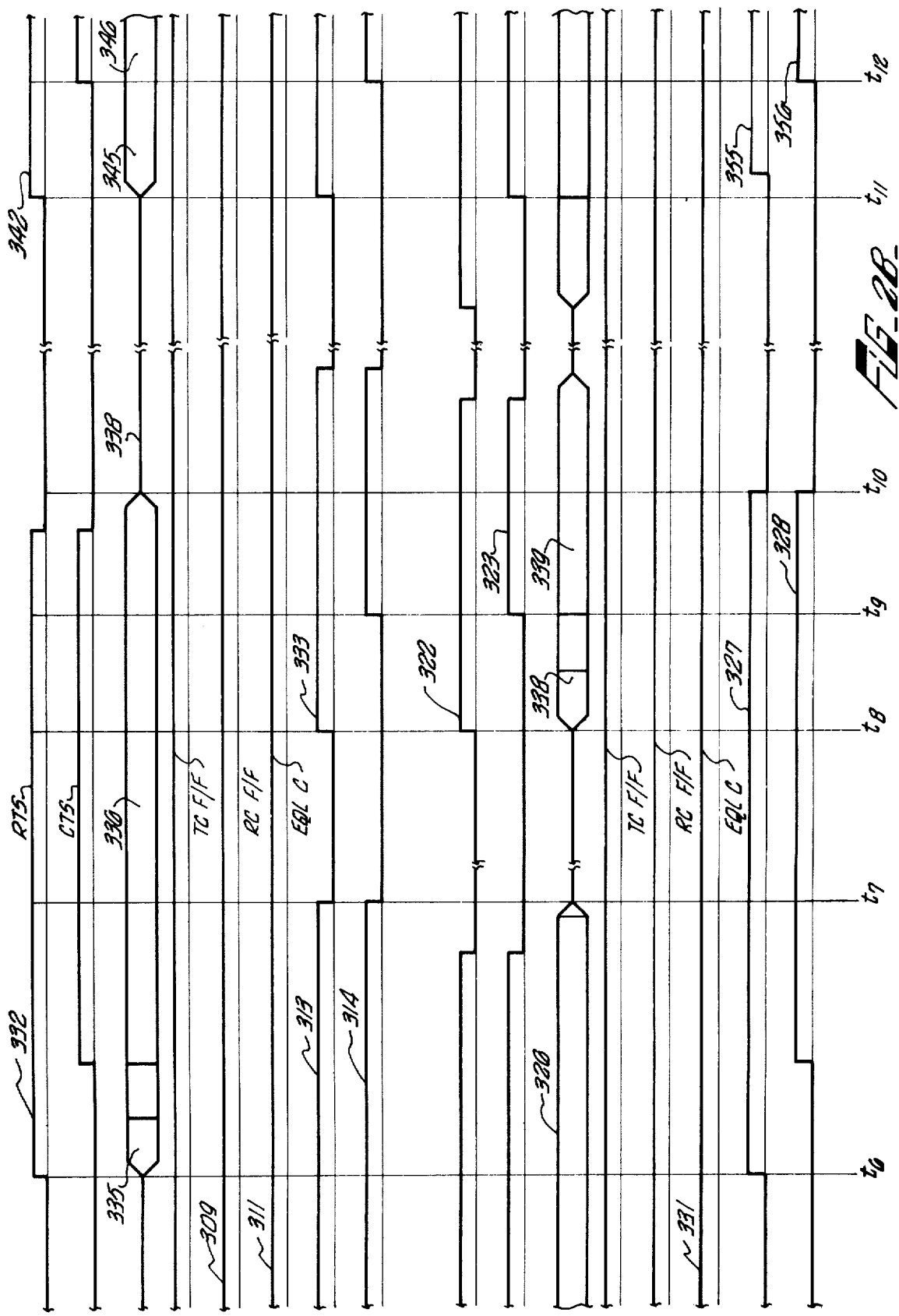

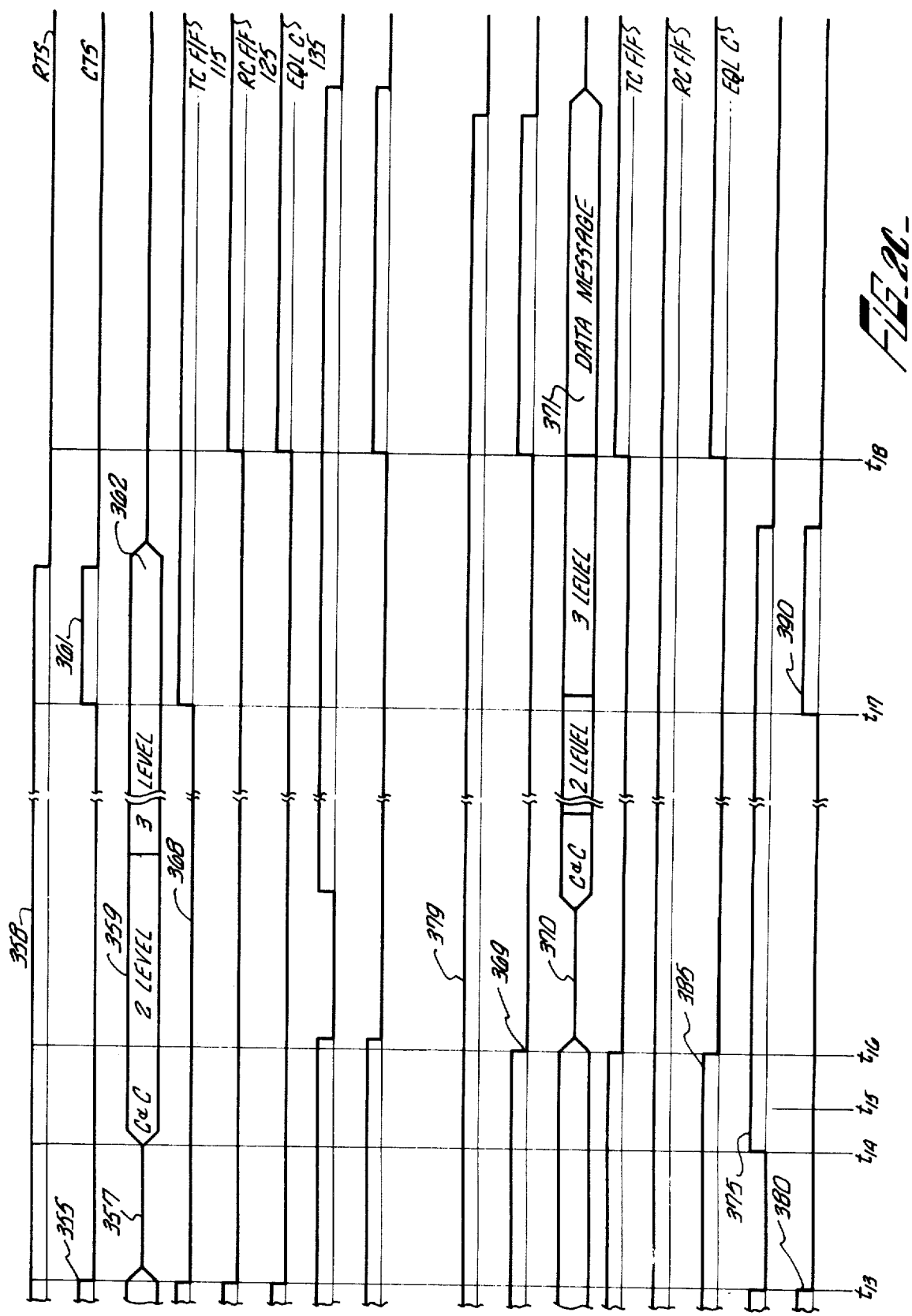

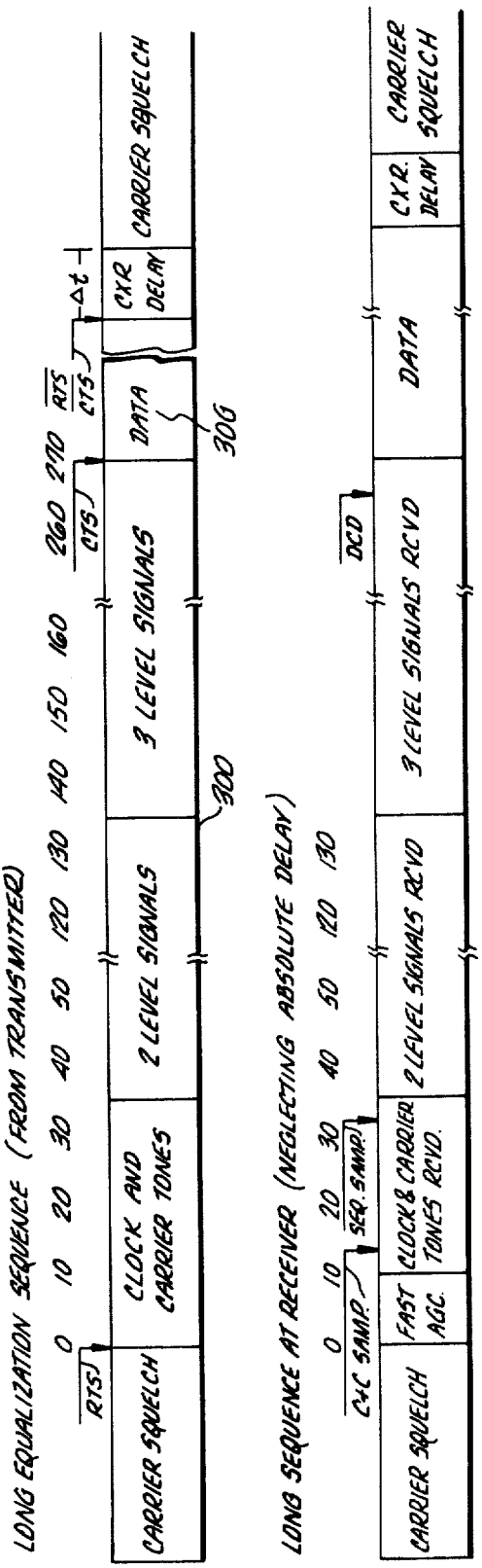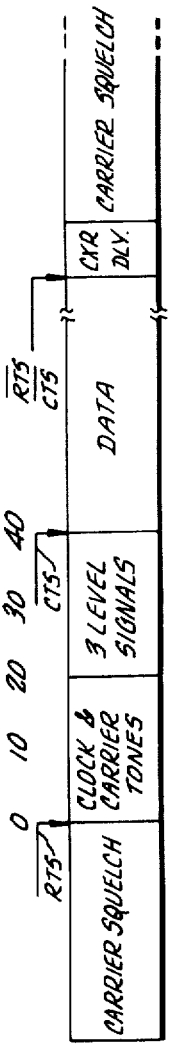
FIG. 3.
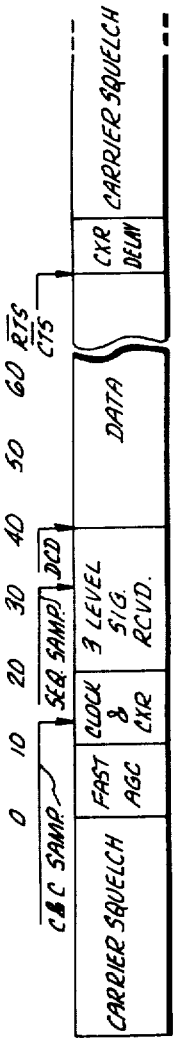
FIG. 4.

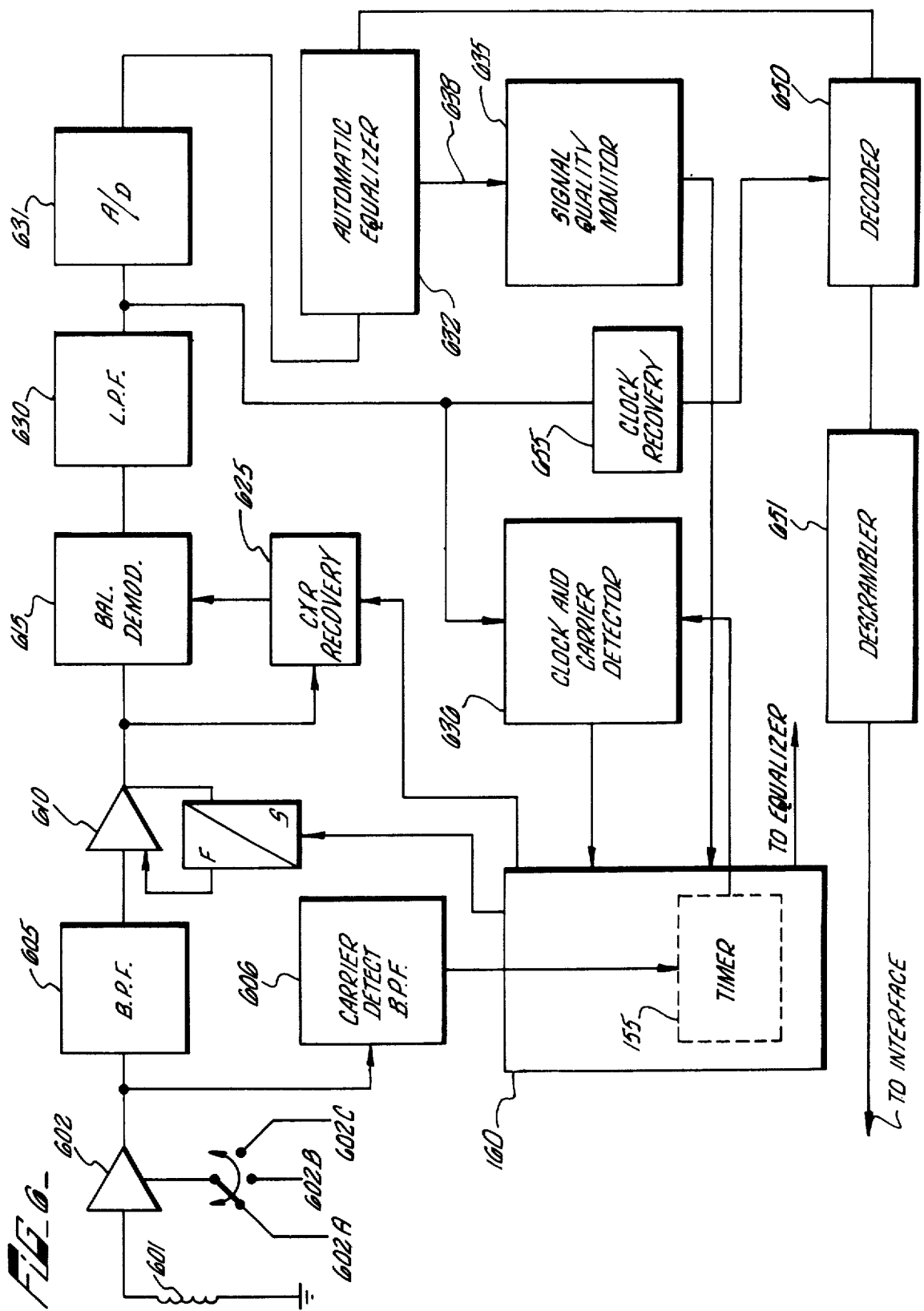

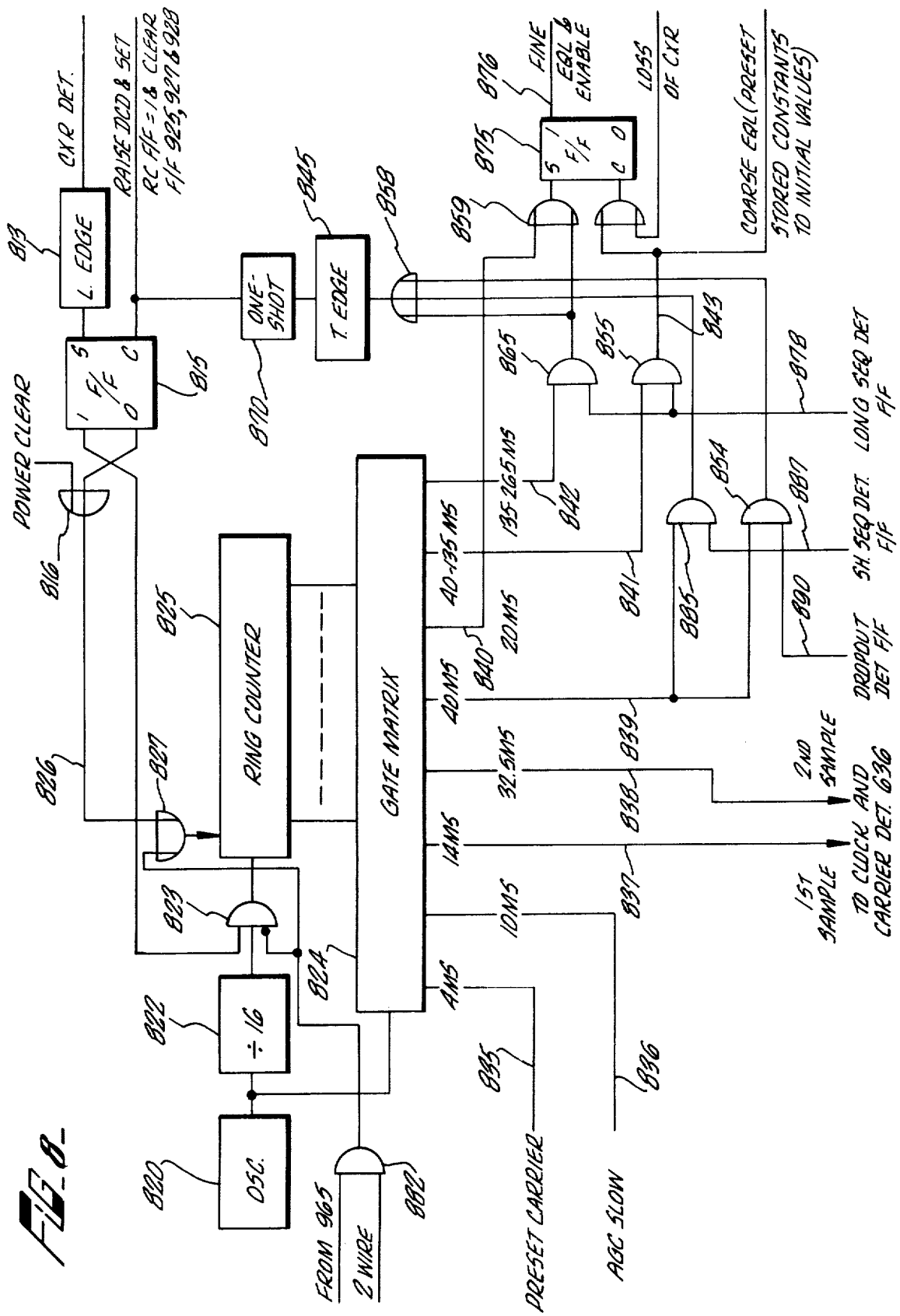

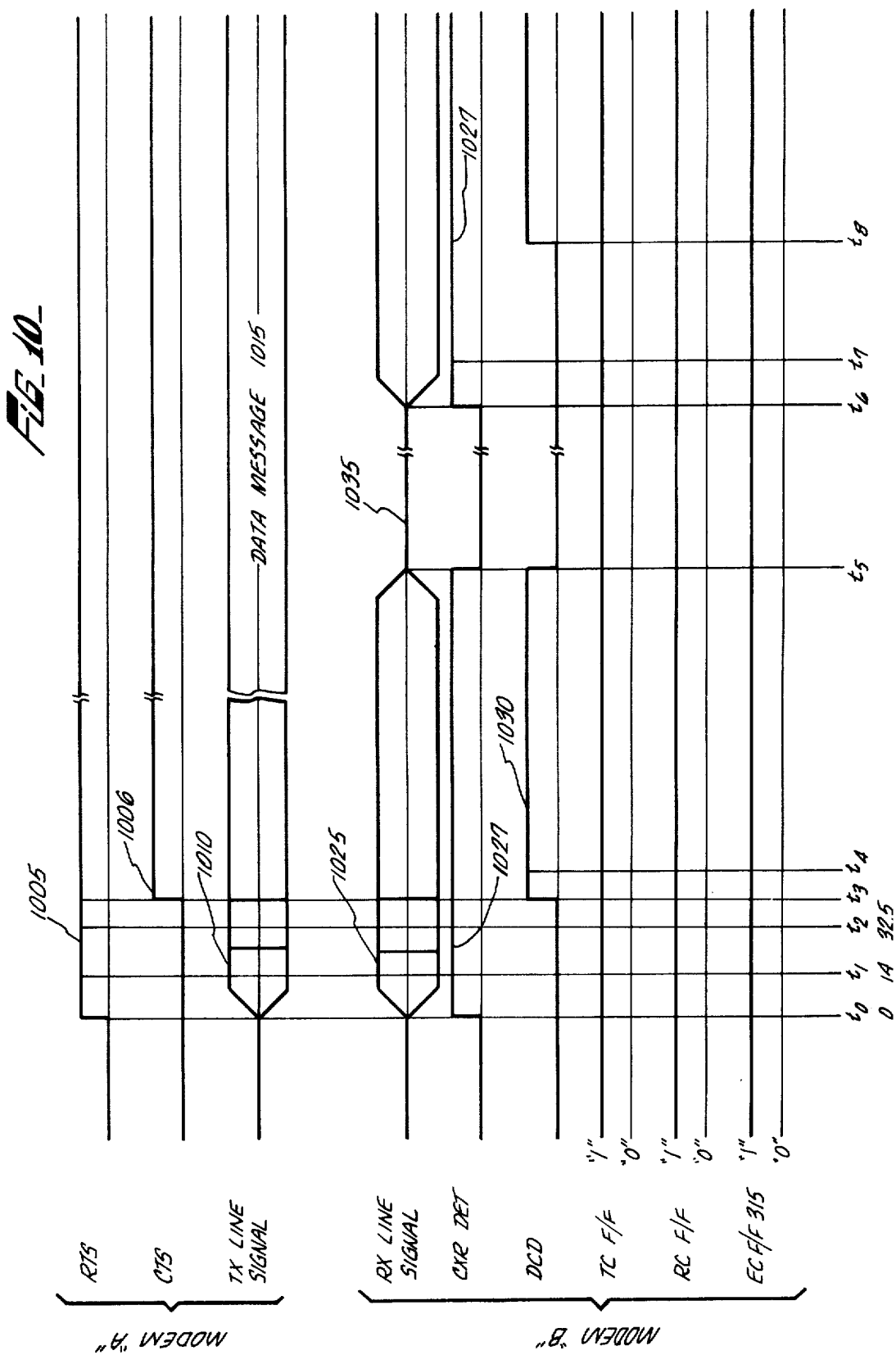

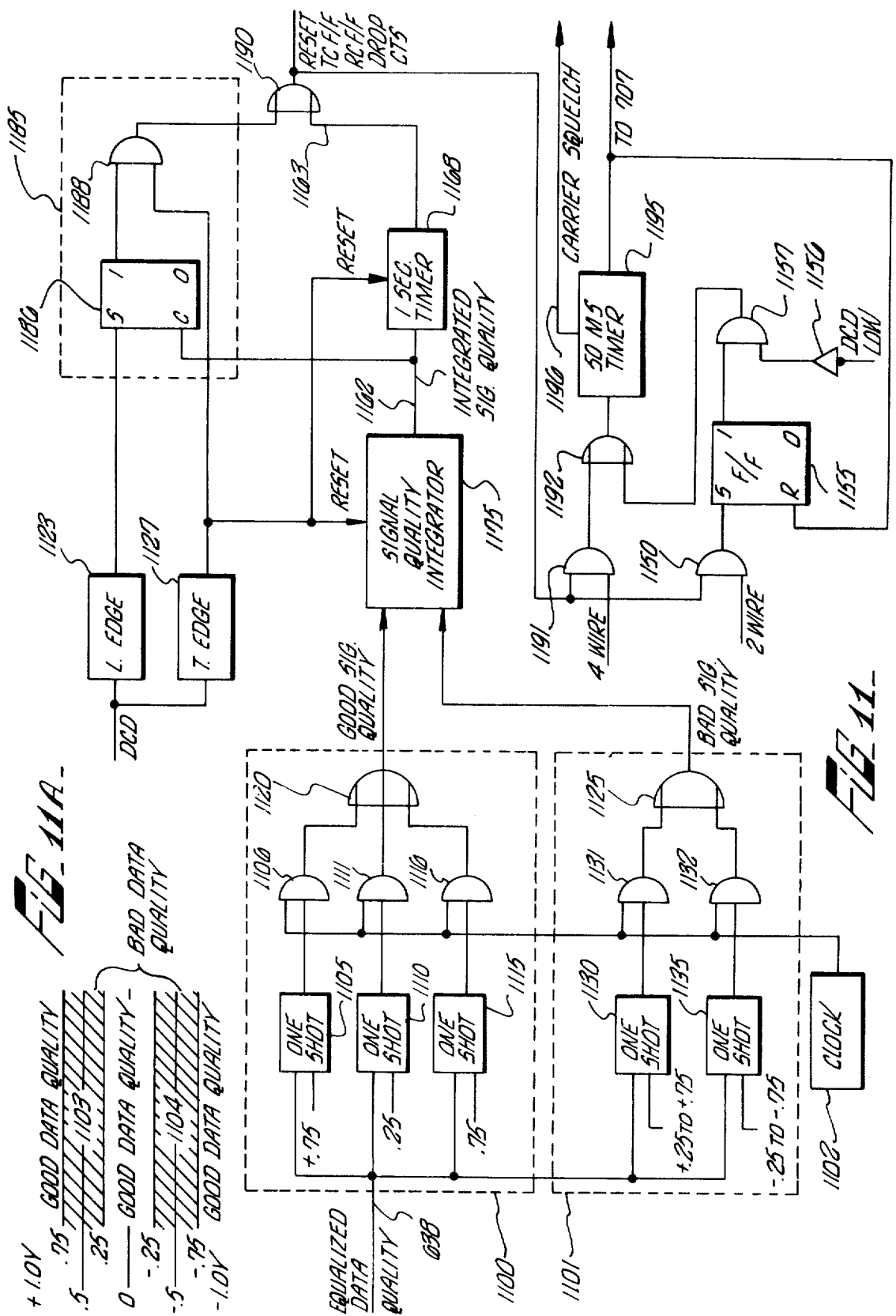

DATA MODEMS HAVING DATA DROP-OUT AND DATA ECHO PROTECTION

This is a division of application Ser. No. 438,387, filed Jan. 31, 1974, now abandoned.

BACKGROUND OF THE INVENTION

1. Field of the Invention

This invention has widespread usage in communication systems wherein the transmission links exhibit variable amplitude and delay characteristics. Typical usage includes commercial, military, and foreign data communication systems over telephone lines.

2. Description of the Prior Art

Data modems capable of transmitting data over ordinary voice grade telephone lines are well known in the art. Such telephone lines exhibit amplitude distortion, phase jitter, delay distortion, phase hits and frequency translation. Because of these adverse conditions caused by the telephone lines, modems require proper equalization for accurate data transmission. As a result of the noise problem, modem equalization, i.e. compensation to correct for and balance out noise caused by the telephone line has become a sophisticated technology.

Initially, signals received at a modem receiver from a modem transmitter were viewed on a scope by an operator while the operator performed manual equalizing adjustments. The data signals when received at an equalized receiver, presented on the scope a particular shape known in the industry as an eye pattern. The use of the eye pattern was not acceptable because the equalization results were difficult to achieve except by highly skilled operators.

The assignee of this invention developed novel techniques of manual and automatic equalization using a frequency domain equalizer in which the scope and eye pattern technique were replaced by a null meter. The null meter depicted a low reading whenever the modem receiver was well equalized. The simplicity of manual and automatic equalizers including the manual and automatic adjustment approaches are fully described in the U.S. Pat. Nos. 3,550,005; 3,566,271; 3,742,360 and 3,644,830 and references cited therein.

Automatic equalizers operating in either time or frequency domain are well known in the art. Such equalizers receive a data stream and automatically adjust signal taps that influence characteristics in order to compensate for distortion caused by telephone lines and other circuit parameters. Generally in the prior art such equalizers state from a "scratch", or non-equalized condition, each time a new data message is received. Such messages are preceded in the prior art by a test sequence which allows the equalizer to adjust the signal taps, in a proper manner for equalization to occur. Data throughput is reduced in the prior art by requiring completely fresh equalization prior to each data message. The myriad of operational conditions that must be taken into account in data modem operation has heretofore prevented fully automatic operation of modems controlling their own equalization and data sequences with reduced equalization time.

SUMMARY OF THE INVENTION

In accordance with the principles of this invention, modems connected together over telephone lines control their own equalization without any necessity for an operator to monitor their performance. Numerous operational possibilities, requiring equalization at unknown times and automatic differentiation between equalization sequences, data drop-outs, data echoes and the like are taken into account so that the modems of this invention control their own equalization and data handling routines in a rapid and efficient manner.

The modems of this invention automatically employ a long equalization sequence and a unique short equalization sequence with appropriate constant storage indicative of a fully equalized condition. Equalizer constants which have a past record of excellence in achieving equalization at a modem receiver via reception of a long equalization sequence are automatically stored for use upon command. Data transmission occurring after a long equalization sequence is successfully concluded, requires that a mandatory short equalization sequence precede each and every data block. Data throughput is increased because the modems automatically use a short sequence preceding each data block until changed circuit conditions require the use of a long equalization sequence. As soon as a long sequence again becomes necessary, the modems automatically initiate and use the long equalization sequence to determine proper equalization constants and then automatically revert back to short sequencing.

The data modems of this invention automatically accomplish equalization without operator intervention and without data terminal equipment associated with the modems knowing that equalization sequences are being exchanged by both modems.

Before describing the figures in detail, a definition of terms will provide a more meaningful understanding of this invention. Certain accepted abbreviations, as employed in the art, are defined to enhance the ease and clarity of description of this invention.

DEFINITIONS OF TERMS

| | |
|---|---|
| DTE — (Data Terminal Equipment) | A DTE is connected to a modem by signal interface circuits that interface data and command signals between the DTE and the modem. Such a DTE may include a computer or other data handling equipment. |
| DTE Data | DTE transmit data signals originate in a local DTE associated with the local transmitting modem. Receive DTE data comprises signals that are originated from a remote DTE and are transmitted from its associated remote modem to the local modem. |
| DSR — (Data Set Ready) | DSR is an output signal from a modem to a DTE. A high or true condition on a DSR output terminal indicates that power to the data modem is on; the modem is not in a test mode; and, in fact, is ready to receive DTE |

-continued

| | DEFINITIONS OF TERMS |
|---|---|
| | transmit data. |
| RTS — (Request to Send) | RTS is a signal applied by a DTE to a modem wherein a true condition on an input lead to the modem indicates that the DTE desires to send transmit DTE data. |
| CTS — (Clear to Send) | CTS is an output signal from the modem to a DTE in response to RTS. A high or true condition on the CTS output terminal indicates that the data modem is ready to accept and transmit data from the local DTE to a remote location. |
| Signal Quality | Signal quality is an output signal from an equalizer within the data modem which indicates how well the modem is recovering receive data based upon allowable margins in the equalizer at the time each data bit decision is made. This function is then used to determine if re-equalization (i.e., use of a long sequence to determine new equalization constants) is required. Signal quality is good in a properly equalized modem receiver, and is bad in an improperly equalized modem. |
| Long Sequence | A long sequence is a particular combination of signals transmitted to a modem receiver which includes an automatic equalizer. This sequence includes both coarse and fine equalization signals. Furthermore, the sequence includes synchronizing signals which are employed to properly synchronize the receive modem's clock, carrier, and automatic gain control circuitry. |
| Short Sequence | Once an automatic equalizer has been properly adjusted and the modem is in an equalized condition, various signals indicative of the fully equalized condition are stored in memory. A short sequence commands the modem to re-use the stored signals for equalization upon receipt of subsequent data messages. Again, this sequence includes synchronizing signals to synchronize the receive modem's clock, carrier, and automatic gain control circuitry. |
| Four Wire Full Duplex | Four wire full duplex is an operational mode for a pair of modems (and associated DTE's) wherein both modems are connected together by a pair of two wire connection paths so that data is capable of being transmitted in both directions simultaneously. When modems are operating in this mode, RTS followed by CTS can be raised at either modem independently of what is happening at the other modem. |
| Two Wire Half Duplex | Two wire half duplex is an operational mode wherein two modems (and associated DTE's) are connected together by a two wire circuit such that only one direction of data transfer can occur at a time. In this mode, RTS can only be raised if Data Carrier Detect is false at the modem, indicating that the two wire line is not being used by equipment at the other end. |
| CXR Detect — (Carrier Detect) | CXR detect is a signal derived in the modem which indicates that the modem's receiver has detected transmitted energy received over a transmission line after such energy was transmitted from a remote station. |
| DCD — (Delayed Carrier Detect) | DCD, an output signal from a modem to its DTE, is derived as a delayed function of CXR detect and provides an indication that signal energy from a remote station is being received at the local modem. |
| Line Signal (TX or RX) | A line signal is any energy transmitted over a telephone line and present in a modem. Such line signals include tones, clock synchronizing signals, data and the like. |

-continued

| DEFINITIONS OF TERMS | |
|---|---|
| TC F/F (Transmit Complete Flip Flop) | TC F/F is a device that is set and held in one predetermined state after the modem has finished transmitting a long sequence. TC F/F changes its held state when another long re-equalization sequence is required at either modem. |
| RC F/F (Receive Complete Flip Flop) | RC F/F is a device that is set and held in one predetermined state after the long equalization sequence has been received at the modem. It changes that held state when another long equalization sequence is required by a modem. |
| EC F/F (Equalize Complete Flip Flop) | EC F/F is a device that responds to the states of TC F/F and RC F/F in order to indicate whether or not that modem's long equalization sequence has been both transmitted and received. |

BRIEF DESCRIPTION OF THE DRAWINGS

FIGS. 2A, 2B and 2C are time and waveform diagrams depicting operation of modems A and B for long and short equalizatiion sequences and a re-equalization sequence. FIG. 2C is a continuation of FIG. 2B which, in turn, is a continuation of FIG. 2A.

FIG. 3 depicts the characteristics of a long equalization sequence at a transmitter and at a receiver;

FIG. 4 depicts the characteristics of a short equalization sequence at a transmitter and at a receiver;

FIG. 5 is a more detailed block diagram of a transmitter 110 or 220 of FIG. 1;

FIG. 7 is a block diagram of a transmitter sequence control and timer circuit such as 150 of FIG. 1;

FIG. 8 is a block diagram of a receiver sequence control and timing circuit such as 160 of FIG. 1;

FIG. 10 is a timing and waveform chart depicting a line drop-out;

FIG. 11A is a waveform showing typical limits for good and bad signal quality for the equalizer 632 of FIG. 6.

DESCRIPTION OF A PREFERRED EMBODIMENT

Figure 1:
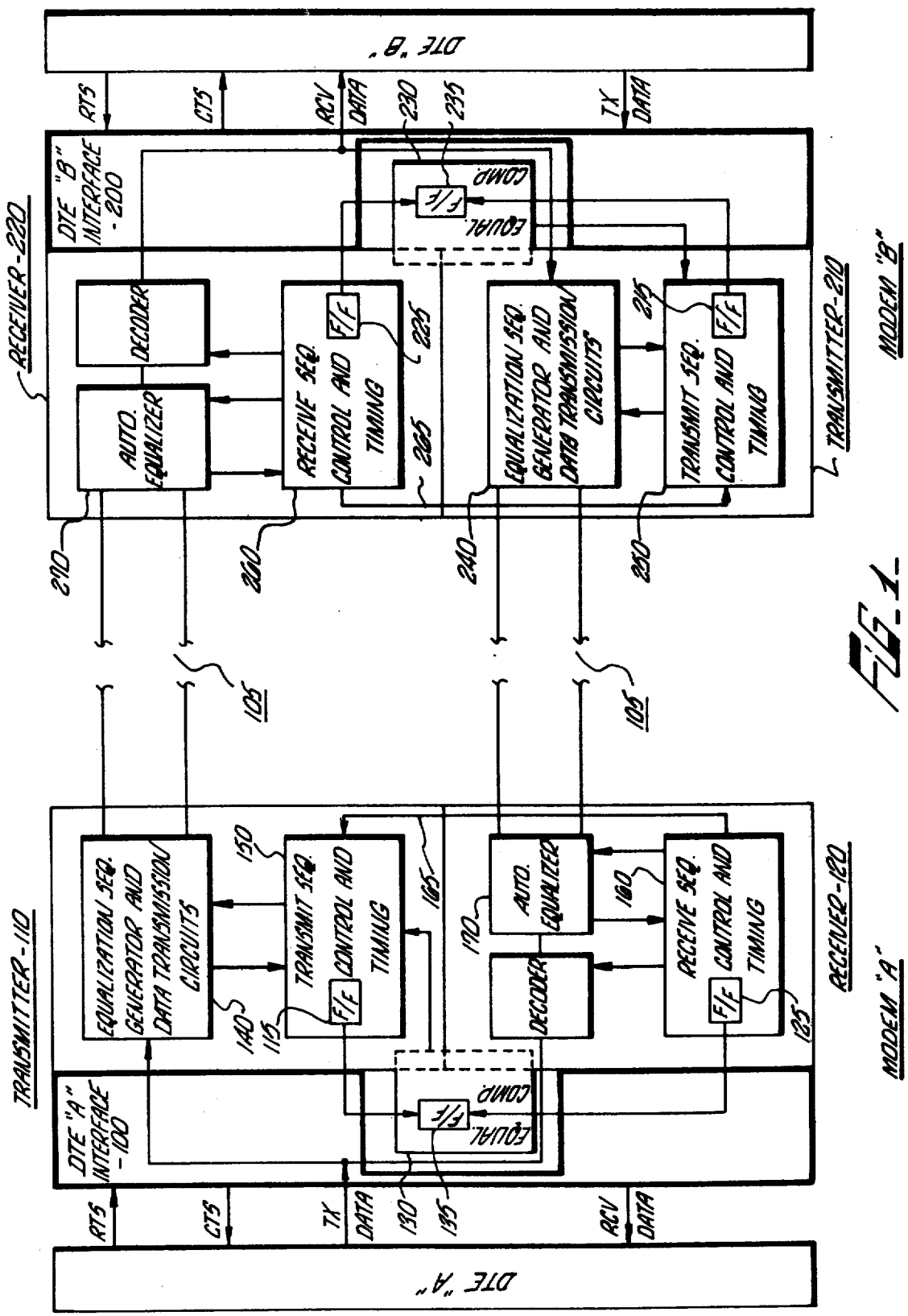
FIG. 1 is a block diagram of modem A and modem B operating in a four wire mode.

FIG. 1 depicts modem A at a local station and modem B at a remote station. Modem A includes an interface circuit 100 which interfaces DTE "A" with modem A's transmitter 110 and its receiver 120. Modem A is connected to modem B via a telephone network 105. The network may be a four-wire (as depicted) or a two-wire telephone line. Either dedicated or direct distance dialed networks may be the modems of this invention as is described in more detail hereinafter.

The invention is first described assuming that modems A and B are connected together via a four-wire dedicated network 105. In such an instance, as soon as power is applied to modem A or modem B, the modems immediately apply DSR to their associated DTE. At modem A, applying power clears flip flops 115 and 125 to a cleared or 0 state. TC F/F 115 is located in the transmit sequence and control circuitry 150. RC F/F 125 is located in the receive sequence control circuitry 160. The states of TC F/F 115 and RC F/F 125 are monitored by an equalization complete circuit 130. Equalization complete circuit 130 includes EC F/F 135. EC F/F 135 monitors the states of both TC F/F 115 and RC F/F 125 in order to determine whether or not modem A's initial equalization is completed. If either TC F/F 115 or RC F/F 125 are in a 0 state, then EC F/F 135 is also in a 0 state and the initial equalization is not complete. If TC F/F 115 and RC F/F 125 are both in a 1 state, then initial equalization is complete.

Assume for purpose of description, that TC F/F 115, RC F/F 125 and EC F/F 135 are all in a 0 state and that modem A receives an RTS signal from DTE "A". Because TC F/F 115 is in a 0 state, transmit sequence control 150 recognizes that the long equalization sequence from modem A to modem B has not been transmitted. In this instance, modem A does not return CTS to DTE "A" until that point in time when TC F/F 115 assumes a 1 state. At that point in time, CTS is raised, indicating that a long equalization sequence has been sent from modem A to modem B.

Modem A includes an equalization sequence generator 140 which, upon command, generates either a long or a short equalization sequence. Generator 140 is under control of a transmit sequence control circuit 150. Transmit sequence control circuit 150 initially responds to an RTS signal DTE "A" via interface circuit 100. In response to RTS, transmit control 150 commands the equalization sequence generator 140 to send a long sequence.

Reference to FIG. 2A, 2B and 2C and FIG. 3 and 4 depict a long equalization sequence and the signals that occur at various points of time after RTS is raised by a DTE. These figures, it should be understood, show time at modem A and at modem B as coincident. In fact, of course, there is an absolute delay due to signal interchanges over the telephone line between modem A and modem B. In FIGS. 3 and 4, zero milliseconds is defined when a DTE raises an RTS signal. Similarly, $t_0$ in FIG. 2A is defined when a DTE raises an RTS signal.

Since TC F/F 115 is in a 0 state at modem A, transmit sequence control and timing circuit 150 commands generator 140 to initially send a long sequence 300, FIG. 3, from modem A's transmitter 110 to modem B's receiver 220. Modem B's receiver 220 includes an automatic equalizer 270 which receives the long equalization sequence 300. Automatic equalizer 270 may be any well known frequency or time domain equalizer which is provided with a plurality of taps. The taps may be adjusted to various values as is needed to compensate for the distortion presented by the telephone line between modem A and modem B. A more detailed description of equalizer 270 is provided hereinafter.

Reference to FIG. 3 shows that prior to RTS being raised at time 0, the carrier in the transmitter of modem A is squelched. Squelching the carrier prior to transmission of line energy is an operation known in the prior art. However, in this invention carrier squelch is employed to an added advantage in that absence of the carrier in certain circumstances is required to initate a command for re-equalization to take place as is described in detail hereinafter.

FIG. 3 further discloses that a long equalization sequence 300 also includes certain clock and carrier tones. These tones are uniquely selected for use at the receiver to quickly achieve automatic gain control and clock and carrier synchronism. At time 0, RTS is received from DTE "A" and control circuit 150 replaces carrier squelch with these clock and carrier tones of the long sequence. These tones last for 35 milliseconds, as shown in FIG. 3. The tones are followed by a two level signal that performs a coarse adjustment of the equalizer 270 at receiver 220. The coarse adjustment signal lasts for 100 milliseconds, and is followed by a three level signal that performs a fine adjustment for equalizer 270. The duration of the fine adjustment signal is 135 milliseconds. These time limits for the signals comprising a long equalization sequence are exemplitive only. Obviously, the sequence is chosen as short as possible for a given modem and a given automatic equalizer. However, for most known modem receivers and automatic equalizers the time durations shown in FIG. 3 are truly representative.

In the long sequence of FIG. 3, the difference between a coarse and a fine adjustment is mainly a function of the modulation scheme employed by the modem. As an example, if the data modem utilizes three level modulation and demodulation for transmitting and receiving data, the coarse adjustment signal may involve a two level signal. The coarse, or two level signal, is then followed by a three level signal which fully exercises the equalizer 270 in order to achieve final equalization.

Transmit sequence control 150 commands equalization sequence generator 140 to send the entire long equalization sequence which lasts for a total of 270 ms. At the end of the sequence 300, sequence control 150 sets the TC F/F 115 to a 1 state. Concurrently with setting TC F/F 115, control circuit 150 returns CTS and DTE "A" as shown by the CTS legend of FIG. 3. CTS is also shown being raised to a plus value on FIG. 2A at $t_3$ which corresponds to 270 ms. DTE "A" thereafter sends transmitted data 306 to modem B's receiver 220. At the end of data block 306 (of whatever duration) as indicated when the DTE lowers RTS, control circuit 150 senses that data transmission is finished and CTS goes false as shown at $t_4$, FIG. 2A, and by the legend CTS (and RTS) of FIG. 3. The carrier signal involved during data transmission remains on for a short duration, $\Delta t$, after data. Thereafter, carrier squelch is commanded by control circuit 150.

A modem B after equalizer 270 has received the long sequence, receive sequence control 260 sets the RC F/F 225 to a 1 state. Keeping in mind the automatic nature of this invention, modem B must thereafter decide whether or not a long sequence should be sent from the transmitter of modem B to the receiver of modem A. That decision is made when equalization complete circuitry 230 checks the status of the EC F/F 235. Since EC F/F 235 is in a 0 state, equalization complete circuitry 230 determines that a long sequence has not yet been sent from modem B's transmitter 210 to modem A's receiver 120. Obviously, for two way data transfer, both directions of transfer over lines 105 must be initially equalized at both receivers.

Assume that modem B has not received RTS from its associated DTE "B" during the time that modem B's equalizer 270 was being equalized. In such an event, equalization complete circuitry 230 would not command modem B's transmit sequence control circuitry 250 to send a long sequence to modem A until DTE "B" raises RTS. It was mentioned before, however, that in a four wire network 105 either DTE "A" or DTE "B" can raise its RTS at any time independent of what the other modem is doing. As shown in FIG. 2A, DTE "B", in fact, raises RTS 321 at time $t_2$. In response to RTS 321, transmit sequence control 250, at modem B, commands the equalization sequence generator 240 to send a long equalization sequence 325 to the receiver 120 at modem A.

During the time that the long sequence 325 is being sent by generator 240 at modem B, receiver 220 is also receiving the long sequence 300 sent by modem A to modem B. As shown in FIG. 2A, long sequence 300 ends at time $t_3$. Thus, the receive sequence control 260 at modem B sets the RC F/F 225 to a 1 state at time $t_3$, as shown by waveform 327. Meanwhile, equalization sequence generator 240 continues to transmit the long equalization sequence 325 from modem B to modem A.

At time $t_3$, FIG. 2A, at modem A transmit sequence control 150 sets the TC F/F 115 to a 1 state as shown by waveform 307. At time $t_5$ at modem A, the long sequence 325 sent from modem B to modem A has been received. Receive sequence control 160 thus sets RC F/F 125 to a 1 state at time $t_5$ as shown by waveform 309. It should be noted that both TC F/F 115 and RC F/F 125 are in a 1 state at time $t_5$ and thus EC F/F 135 also assumes a 1 state as shown by waveform 311.

Similarly, at time $t_5$ modem B, sequence generator 240 has completed transmission of long sequence 325 and thus TC F/F 215 is set to a 1 state as shown by waveform 328. Earlier at time $t_3$, RC F/F 225 assumed as 1 state as shown by waveform 327. Accordingly, at time $t_5$ equalization complete circuitry 230 senses the fact that both TC F/F 215 and RC F/F 225 are in 1 states, and equalization complete circuitry 230 sets EC F/F 235 to a 1 state as shown by waveform 331. The transmission paths from modem A to the receiver of modem B, and from the transmitter of modem B to the receiver of modem A are now fully equalized. This equalization is indicated in FIG. 2A at time $t_5$ when both EC F/F 135 and 235 are in a 1 state as shown by waveforms 311 and 331 respectively. Thereafter, any time RTS is subsequently raised to either modem A or modem B, data messages are automatically preceded by a short equalization sequence.

A long re-equalization sequence is not again required unless a dramatic change such as loss of power, change of telephone lines, circuit disturbances or the like occur to the point that data is not properly being received.

As modem A transmits subsequent blocks of data to modem B (and vice versa) over the established line, there is no necessity to go through the long equalization sequence prior to each data message. Instead, the stored signals are utilized at the automatic equalizer 270 and only a short sequence must precede each block of data to be transmitted. The purpose of the short sequence is to synchronize clock and carrier, set the AGC level and fine tune the automatic equalizer prior to receipt of each block of transmitted data. The short equalization sequence corrects for any slight variations that may have occurred in the telephone line or circuitry during the time interval between data blocks.

As mentioned earlier, a long equalization sequence as shown in FIG. 3 includes during its first 35 ms. two separate clock and carrier tones. These tones are two unique frequencies which in a preferred embodiment of this invention may be respectively selected at 900 and 1600 Hz. Between 35 and 135 ms. in the long sequence, the signal comprises a series of two level signals. For the next 135 ms., i.e. 135–270 as shown in FIG. 3, the long equalization sequence comprises a series of three level signals.

A concise definition of levels for data handling is set forth in U. S. Pat. No. 3,760,277 assigned to the same assignee as the present invention. As there noted, it has been the practice of the prior art to relate the number of bits to the baud, or transmission period, by whole integers such as 1, 2, 3, etc. In the U.S. Pat. No. 3,760,277, the bit-to-baud ratio is a mixed number. As a typical example, if three binary bits are grouped together, the identity of the middle bit is partially shared by the first and the last bit of the group. Thus, two signalling elements (each called a "Trit") during two adjacent transmission periods represent the identity of the three bit group. In such an instance, the bit-to-baud ratio is one and one half. Three binary bits grouped together offer eight ($2^3$) possibilities of binary combinations. A three level system of the U.S. Pat. No. 3,760,277 yields nine possibilities ($3^2$). The possibility that is not used for identifying a data group provides signal energy from which a clock at a receiver may readily be derived.

The coding and decoding system of aforementioned U.S. Pat. No. 3,760,277 is suitable for application in this invention, although this invention is not limited to that preferred embodiment. Reference to the U.S. Pat. No. 3,760,277 provides complete details of the coding and decoding system if needed. FIG. 3 of the U.S. Pat. No. 3,760,277 shows that a two level signal (as used in the long equalization sequence) may be selected from a +Y or a −Y for each of the Trits. Thus, for a two level signal in the long equalization sequence the zero level is ignored for both Trit No. 1 and Trit No. 2 of each Trit pair. A three level signal in a long equalization sequence utilizes a +Y, 0 and a −Y for both Trits of each Trit pair.

Reference to FIG. 3 and FIG. 4 discloses differences between long and short sequences. For example, FIG. 3 shows that CTS is returned from a modem to a requesting DTE about 270 ms. after RTS is delivered to the modem when a long equalization sequence is involved. As shown by the legend of FIG. 4, in contrast, CTS is returned to a modem 40 ms. after RTS is delivered when a short sequence is involved. The major difference in time between the long and short equalization sequence is that the two level, or coarse adjustment signal of the long sequence is not present in the short sequence. Furthermore, the time duration of the three level signal is only 20 ms. in the short sequence, whereas this signal occupies 135 ms. in the long equalization sequence. It should further be noted that the clock and carrier tones occupy 35 ms. and 20 ms. of clock and carrier tones respectively for the long and short sequences respectively. Accordingly, if the receiver to which the data modem is transmitting has previously been equalized by a long equalization sequence, and no circumstances between the two modems requires a repeat of the long equalization sequence, the short equalization sequence will thereafter precede each block of data sent to the receiver. The data throughput is markedly increased because the short equalization sequence requires less time than repeated use of long sequences as is true in the prior art.

Between time $t_3$ and $t_4$ as shown in FIG. 2A, CTS 303 is positive or true. CTS is true during the entire time that data 306 is being sent from modem A to modem B. At time $t_4$, data 306 ends and CTS 303 drops low, or negative, since RTS drops low at the end of data message 306. A finite time $\Delta t$ is required for the carrier or line signal to decay to zero at the end of data message 306. This finite time is identified in FIG. 3 and FIG. 4 as CXR delay. It should be noted carrier squelch 301 precedes and follows each line signal. CXR detect signal 329 at modem B is concurrent in time with the presence of the line signal received at modem B from modem A. Accordingly, CXR detector signal 329 drops low when CXR delay signal 308 drops low at time $t_4$ plus $\Delta t$ as shown in FIG. 2A.

At time $t_6$, FIG. 2B, DTE "A" again raises RTS 332. In this instance, EC F/F 135 is in a 1 state and thus only a short equalization sequence 335 precedes data block 336. At modem B, at time $t_6$, the transmitter is still transmitting a data message 326. That transmission, of course, is independent of the operation of receiver 220 at modem B.

Data message 326 ends at time $t_7$ for the transmitter 210 of modem B. Similarly to the case described earlier for modem B, at time $t_7$, at modem A, CXR detect signal 313 and DCD signal 314 drop to a low condition. That low condition for CXR detect is held until time $t_8$ when modem B transmits a short sequence 338 and a new data message 339, in response to a new RTS signal 322 from modem B.

At modem B's transmitter, CTS signal 323 is returned to DTE "B" at time $t_9$. Comparing the time intervals between $t_2$ and $t_5$, FIG. 2A, and $t_8$ and $t_9$, FIG. 2B, it is clear that modem B returns CTS and DTE "B" much quicker when only a short sequence is involved. In essence, both modem A and modem B respond to RTS from their associated DTE's but the modems control the DTE's in the sense that CTS must be returned before the DTE's can transmit data. Of course, the DTE's do not have any control over what is happening in the modems and thus the DTE's, in this invention, are electrically locked out until the modems are satisfied that equalization conditions are proper.

At time $t_{10}$, at modem A, the data message 336 ends. Concurrently, at modem B, CXR detect 327 and DCD 328 drop to a low condition. Thereafter, the operation of FIG. 2B will be repeated with short sequences preceding data messages unless a re-equalization is required.

In the description of the operation so far, it has been assumed that modem A or modem B knew that the other modem was sending a long or a short sequence. In fact, such an assumption, although proper for purposes of explanation, is not possible. Both modem A and modem B comprise means for determining whether a long or a short sequence is being received. Since the operation of both modem transmitters and receivers are identical, the means for detecting a long or short sequence will be described with reference to receiver 120 of modem A. Similarly, the operation for transmitting a long or short sequence will be described with reference to transmitter 110 of modem A.

TRANSMITTER OPERATION

In the transmitter 110, FIG. 5, the receipt of RTS 302, FIG. 2A, starts a transmit sequence timer 145 in control circuit 150. The transmit sequence timer 145 emits a series of timed pulses which are employed to generate clock and carrier tones and two level and three level signals of the proper time duration as required for appropriate equalization sequences. The transmit sequence timer circuit 145 will be described in more detail in conjunction with FIG. 7, following a more detailed description of the operation of the circuitry of FIG. 5.

In FIG. 5, interface buffer 100 handles interface signals between DTE "A" and modem A. These various interface signals include RTS, CTS, and data transmit/receive, as defined earlier. Connected to the output of the interface buffer 100 is the equalization sequence generator as shown in dashed lines 140. Before describing the sequence generator 140 in detail, a brief digression is in order.

As mentioned earlier, the U.S. Pat. No. 3,760,277 utilized proper selection of the unused ninth possibility in order to provide a clock signal at a receiver. A long term sequence of random data with the trinary format automatically supplies an envelope from which the clock signal may be derived at the receiver end. In the particular preferred embodiment described herein, the clock signal for Trit pairs is 3200 Hz. That clock signal, at a receiver, is derived from a tone of 1600 Hz as is described in the U.S. Pat. No. 3,760,277. Also described in the U.S. Pat. No. 3,760,277 is a vestigial sideband modulation system which is employed in this invention as a preferred embodiment. For this invention, the carrier signal is selected at 2500 Hz.

It was mentioned earlier that clock and carrier tones are first generated, for a given 35 ms. time interval, at the beginning of a long sequence. Transmitter 110 of FIG. 5 includes a scrambler 505 of any well known type. The sequence control 150 commands scrambler 505 to assume a forced condition, as opposed to its normal psuedo-ramdom pattern. This condition for scrambler 505 provides an output signal which is applied to a binary to trinary encoder 510. The detailed disclosure of the binary-to-trinary encoder is described in the U.S. Pat. No. 3,760,277 and need not be repeated here.

Connected to the binary-to-trinary encoder 510 is a digital-to-analog converter 515. Converter 515 changes the digital output from the encoder 510 to an analog signal. Connected to the output of the digital-to-analog converter 515 is a low pass filter 516. This low pass filter 516 is selected to have a cut-off at 1600 Hz. It therefore cuts off all signal frequencies higher than 1600 Hz. The signal at this point in the circuit is a baseband signal having energy between 0 and 1600 Hz. The baseband analog signal from the low pass filter 516 is supplied to a balanced modulator 520. Balanced modulator 520 receives a modulating carrier selected at 2500 Hz from signal generator 526. It also receives a d-c voltage as a second input signal. In the balanced modulator circuit 520, the 0 to 1600 Hz signal from the low pass filter 516 is changed to a sum and difference signal. The d-c signal is summed with the modulating carrier of 2500 Hz to yield an output signal of 2500 Hz. The difference between 1600 Hz and 2500 Hz is a 900 Hz tone. Both the 900 and 2500 Hz frequencies are therefore present in the output signal from the balanced modulator 520 when the transmitter sequence control 150 is sending clock and carrier only at the beginning of either a long or a short sequence.

Connected to the output of the balanced modulator circuit 520 is a send carrier control circuit 525. The send carrier control circuit 525 is a switch which is either enabled or disabled depending upon whether the modem is operating in a four-wire/full-duplex or a two-wire/half-duplex mode. In our assumption to this point, modem A is operating in a four-wire/full duplex mode. In this mode, the send carrier control switch 525 is enabled and the output of the balanced modulator 520 is applied directly to the bandpass filter 535. The bandpass filter 535 has a passband between 900 and 2500 Hz. It thus selects the energy spectrum between 900 and 2500 Hz for application to an output transformer 540. Output transformer 540 supplies a line signal for transmission over telephone line 105 to modem B.

Thirty-five ms. after the start of the long sequence, the transmitter sequence control 150, FIG. 5, selects a two level encoding format for the encoder 510. The two level format as described earlier is used at the receiver for a coarse adjustment of the equalizer. After the two level signal has been transmitted for approximately 100 ms., transmitter sequence control 150 applies a command to encoder 510 to send a three level signal to the receiver so that fine tuning of the equalizer at the receiver is accomplished. At the conclusion of the three level signal for the long equalization sequence, the transmitter sequence control 150, via interface buffer 100, supplies CTS to DTE "A" and sets its own TC F/F 115 to a 1 state. Equalization complete circuitry 130 monitors the status of TC F/F 115 and RC F/F 125. Gate 134 must be satisfied by 1 states in both TC F/F and RC F/F's before EC F/F 135 assumes a 1 state, as described earlier.

At the conclusion of the long sequence, a data message is transmitted from the transmitter 110 through the telephone line 105 to the equalized receiver at modem B.

Data messages are transmitted by the same circuitry that is utilized to generate the long sequence. Thus, a three level random data message from DTE "A" is scrambled by scrambler 505 and encoded by encoder 510. Further processing of the data message by the circuitry of FIG. 5 is in accordance with the vestigial sideband modulation operation previously described.

The transmit sequence timer 145 and control 150 is shown in more detail in FIG. 7. In FIG. 7, at time $t_0$; FIG. 2A, a leading edge detector 703 senses RTS 302 and sets flip flop 705 to a 1 state. The set condition of flip flop 705 removes via OR gate 707 a clear and pre-conditioning signal for a ring counter 715. Ring counter 715 is of any known type in which the first stage is pre-conditioned to a 1 state while the following stages are cleared to 0 states. An oscillator 720 at a suitable frequency such as 16,000 Hz is divided down to 1,000 Hz by a divide-by-16 circuit 722. The output signal from divider 722 is connected to the input to ring counter 715. Counter 715 circulates the pre-conditioned signal in a well known fashion so as to form a time variable input signal for a gate matrix 724. Gate matrix 724 is any well known matrix of gates which emit pulses having the time durations shown associated with the output leads of matrix 724. Connected to output leads 725, 726, and 727 are AND gates 735, 736, and 737 respectively.

In the transmit sequence control circuit of FIG. 7, input lead 723 is connected to the "set" or 1 output terminal of EC F/F 135. Lead 723 is connected to an inverter 721 which in turn supplies an input signal to AND gates 735, 736, and 737 if EC F/F 135 is in a 0 state. Thus, inverter 721 inverts a 0 state in EC F/F 135 to an enabling signal for AND gates 735 through 737.

When enabled, the AND gates 735 through 737 command the equalization sequence generator 140 to transmit a long sequence. On the other hand, if EC F/F 135 is in a 1 state, that 1 state places an enabling signal on the input leads for AND gates 738 and 740. The gate matrix 724 supplies output signals on leads 728 and 729 for the time durations shown. Thus, when EC F/F 135 is in a 1 state, only a short sequence is transmitted. In such an event, gates 738 and 740 are enabled to command generation of clock and carrier tones for the 20 ms. time duration of the short sequence followed by three level signals. Connected to output leads from gates 737 and 740 are trailing edge detectors 741 and 742. Detector 741 emits a pulse at the end of 270 ms. (long sequence). Similarly, detector 742 emits a pulse at the end of 40 ms. (short sequence). Connected to the output leads of detectors 741 and 742 is an OR gate 745 which triggers a one-shot 750. The output from 750 resets flip flop 705 to a 0 state. With flip flop in a 0 state, the ring counter action of counter 715 is stopped due to the inhibiting action of gate 725. Concurrently, an output pulse from one-shot 750 also sets the TC F/F 115 to indicate that transmission of the long equalization sequence is complete. The output signal from one-shot 750 also, in a known manner, raises CTS through interface 100 for DTE "A". CTS, when received by DTE "A", allows for normal data message transmission from modem A to modem B to be initiated.

As shown by the legends of OR gate 707, either a power clear signal, a manual or automatic re-equalize will also preset the ring counter 715. In any event, the operation as just described repeats depending upon whether a long or a short equalization sequence must be transmitted.

RECEIVER OPERATION

Figure 6:
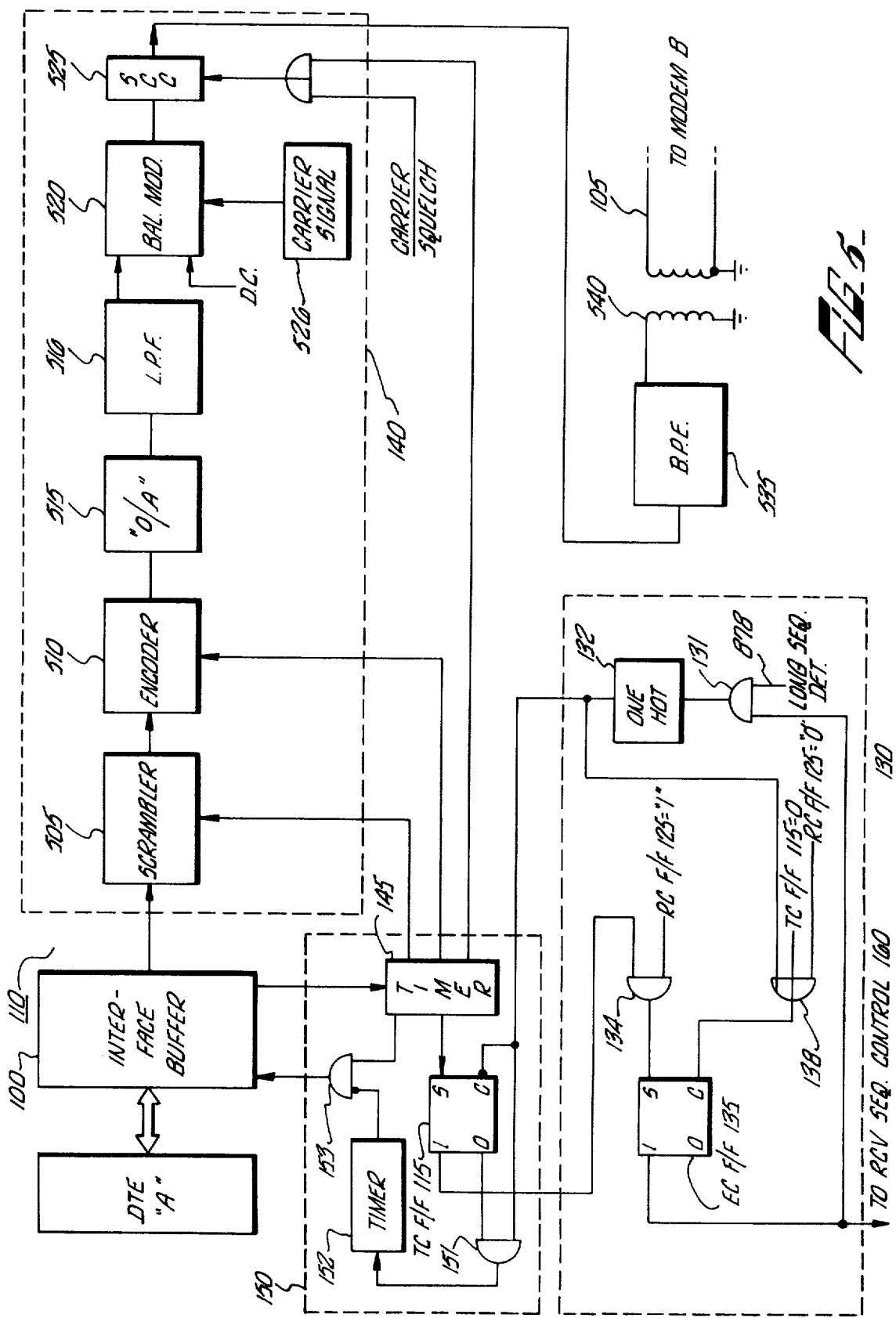
FIG. 6 is a more detailed block diagram of a receiver 120 or 210 of FIG. 1.

FIG. 6 depicts a block diagram of the receiver sequence control and timing logic. The receiver sequence control 160 of modem A will be described generally with respect to the functions that must be accomplished. It was noted earlier that the modem A is free of any master/slave relationship with modem B and vice versa. The receiver 120 thus has no way of knowing whether the signal it is receiving is line noise or an equalization sequence (long or short) or primary data. It is, therefore, essential that receiver 120 detect the character of the signal being received.

The problem of detecting the character of the signal being received at receiver 120 is compounded further because line drop outs may occur in the signal transmitted from a transmitting modem to a receiving modem. Such drop outs result from events such as loss of carrier, violent noise disturbance on the telephone lines, and other similar factors. Such drop outs are random in nature and are of unspecified duration. In many instances, the drop out will constitute a complete loss of signal for its time duration. If the duration of such a drop out is significantly long, the drop out may be interpreted by the receiver as if the transmitting modem had finished sending data. In that event, the receiver would go back to a mode wherein it is looking for the next upcoming equalization sequence when in fact the drop out was only temporary and primary data is still being received from the transmitting modem.

The receiver sequence control 160, FIG. 6, includes a sequence timer 155. The timer 155 generates sample pulses that sample the characteristics of the signal received at receiver 120. Differences between a long and a short sequence are utilized to distinguish between the two signals. In a similar manner, differences between an equalization sequence and primary data provides an indication of whether or not a drop out has occurred. These operations are described in detail following a general description of the receiver operation of FIG. 6.

Input signals are received in FIG. 6 at an input transformer 601. These signals have either been transmitted from modem B and received at receiver 120 over telephone line 105 or are received directly from modem A (assuming a back-to-back mode of operation). These received signals are first amplified by a step gain amplifier 602. Amplifier 602 includes a plurality of switch settings 602A, 602B, 602C to change the gain increments of amplifier 602 by any desired amounts. For example, switch position No. 602A may provide a gain suitable to process an input signal ranging between −6dB to −26dB. Switch position No. 602B may provide a gain to handle a signal from −16dB to −36dB, and switch position No. 602C may provide a gain to handle a signal from −26dB to −46dB. These switch positions allow an operator to manually select a suitable position based on the type and quality of this telephone line being employed. Thus, either dedicated lines and/or dial-up telephone lines may be utilized depending upon the switch position for step gain amplifier 602.

Connected to the output of amplifier 602 is a bandpass filter 605 and a carrier detect filter 606. Bandpass filter 605 is selected to pass signals in the frequency range of 900 to 2500 Hz. The output signals from filter 605 are applied to an automatic gain control amplifier 610. Automatic gain control amplifier 610 may be of any known type which is capable of operating in either a fast or a slow gain mode. When a line signal is first received, the automatic gain control amplifier 610 is in a fast mode. In the fast mode, automatic gain control amplifier 610, within approximately 10 ms., locks onto a proper level for the line signal. After the 10 ms. time interval, the automatic gain control circuit 610 is placed in a slow mode by timer 155 in receive sequence control circuit 160.

The purpose of the fast AGC setting is to quickly stabilize the AGC output signal prior to using the AGC output signal in the carrier recovery circuit 625 and the clock recovery circuit 655. This AGC stabilization provides for a fast phase and frequency lock operation to occur in both carrier and clock recovery in carrier detect circuit 625 and clock recovery circuit 655 respectively.

Suitable phase and frequency compensators for carrier recovery circuit 625 are known in the prior art and need not be described in detail. A typical phase and frequency compensator circuit is fully described in U.S. Pat. No. 3,644,830 assigned to the same assignee as the present invention.

Connected to output of AGC 610 is a balanced demodulator 615. The balanced demodulator 615 receives a demodulating tone from carrier recovery circuit 625. The demodulating tone is at the carrier frequency and is correlated in phase and frequency. The balanced demodulator 615, when the demodulating pilot tone from circuit 625 is properly correlated in phase and frequency, yields a baseband signal at its output. The baseband signal is applied to a low pass filter 630, which low pass filter has a cut off frequency selected at 1600 Hz.

Connected to the output of the low pass filter 630 is a phase locked clock recovery circuit 655. That clock recovery circuit for the Trit pair is fully described in the U.S. Pat. No. 3,760,277 and need not be repeated here. Briefly, the clock recovery circuit 655 selects the 1600 Hz sign wave from the output of the low pass filter 630 and delays the output by 90°. A limiter and edge detector circuit of any well known type squares the delayed 1600 Hz sign wave to a squared wave form. Both a leading and a trailing edge detector for the 1600 Hz square wave is employed by a receiver timing control circuit 655 to emit a 3200 cycle per second clock that is used to decode data.

Also connected to the output of the low pass filter 630 is an analog-to-digital converter 631 which converts the analog signal to a digital signal in a well known manner. The digital signal output from converter 631 is applied to a time domain equalizer 632. Time domain equalizer 632 may be any well known transversal filter having a register 633 for storing constants indicative of the attenuation settings of the various equalizing taps of automatic equalizer 632. The equalizer tap positions are automatically adjusted to a proper value for equalizing the receiver. Signals indicative of those tap settings are placed in storage where they are under command of the receiver sequence control 160. The equalizer 632 is described in more detail in conjunction with FIG. 12 hereinafter.

Connected to the equalizer circuit 632 is a signal quality monitor circuit 635. The purpose of the signal quality monitor circuit 635 is to detect, after equalization, whether data is or is not being received properly. The signal quality monitor 635 also detects if a power interruption has occurred. A power interruption so seriously affects the receiver as to require a re-equalization. Details for the signal quality monitor 635 are described in more detail hereinafter.

A decoder circuit 650 receives the equalized trinary signals from automatic equalizer 632. Clock recovery circuit 655 is employed to decode the Trit pairs to the original binary format. Connected to the output of decoder 650 is a de-scrambler circuit 651 of any well known companion type to the scrambler circuit at the transmitter. De-scrambler 651 reorganizes the scrambled binary output signals from decoder 650 to the original data format for delivery via an interface circuit to a DTE.

It was mentioned earlier that receive sequence control 160 must determine the character of the signal being received. The long and short equalization sequence includes clock and carrier tones during the first 35 and 20 ms. respectively. At the receiver 120, receive sequence timer 155, FIG. 6, is started by the leading edge of a CXR detect signal from a carrier detect filter 606.

Carrier detect circuit 606 includes a precisely tuned 2500 Hz filter that passes only 2500 Hz within approximately ±50 Hz. In all prior art modems comparable carrier detector circuits comprised broad band filters that respond to any energy received over the line. Thus, in the past, a busy signal or the like would be erroneously detected as a carrier. Once detected in the prior art, DCD would be raised. In our modem invention, it is essential that DCD be raised only when a true carrier is present in the line signal being received because the absence of carrier is indicative of a drop-out or a command to re-equalize. The significance of carrier detect circuit 606 and its role in the operation of detecting drop-outs and/or commands to re-equalize is described in more detail hereinafter following a description of the details of timer 155 in conjunction with FIG. 8.

FIG. 8 is a more detailed block diagram of the receive sequence control 160 and timing circuit 155. An oscillator 820, selected at a suitable high frequency such as 16,000 Hz, drives a divide-by-16 circuit 822 so as to supply a 1,000 Hz input signal to a ring counter 825 provided that gate 823 is not inhibited. Ring counter 825 is similar to the type described hereinbefore with respect to FIG. 7. When a CXR detect signal goes high, in response to an output from carrier detect circuit 606, FIG. 6, 0 ms. is defined. The high condition for a carrier detect signal is detected by a leading edge detector 813. Detector 813 sets the receive timer initiate F/F 815 to a 1 state. Connected to F/F 815 is an OR gate 816 which functions to clear and pre-condition ring counter 825 so that a 1 state is present in the first stage, and all other stages of ring counter 816 are in a 0 state. Connected to the output leads of ring counter 825 is a gate matrix 824 of any well known type. The gate matrix is connected to oscillator 820 and responds to the various timed output signals from ring counter 825, in a well known manner to gate out timing control signals as required by the receive sequence control circuit 160. The timing control signals ascertain whether a line signal being received is a long or short sequence or a line drop out.

The first timed output from gate matrix 824 occurs on lead 835 at time 4 ms. This output signal supplies a pre-set carrier command to the carrier recovery circuit 625 of FIG. 6. Its function is to gate a high amount of carrier energy into the phase and frequency correction circuit 625, FIG. 6, so as to lock the local carrier in phase and frequency to the received carrier. The phase and frequency correction circuit 625 immediately syhchronizes the receive carrier to be proper both in phase and frequency with the carrier received over the telephone line. On output lead 836, a signal occurs at 10 ms., this output signal switches the AGC circuit 610 from its fast to its slow mode for the reasons described earlier in conjunction with FIG. 6.

An output signal on lead 837 at time 14 ms. allows clock and carrier detect circuit 636 to detect for presence of the clock and carrier signals at the output of the low pass filter 630, FIG. 6. This output signal at 14 ms. is a first sample. That first sample determines whether an equalization sequence is being received by determining if only clock and carrier tones are present in the receive line signal.

Figure 9:
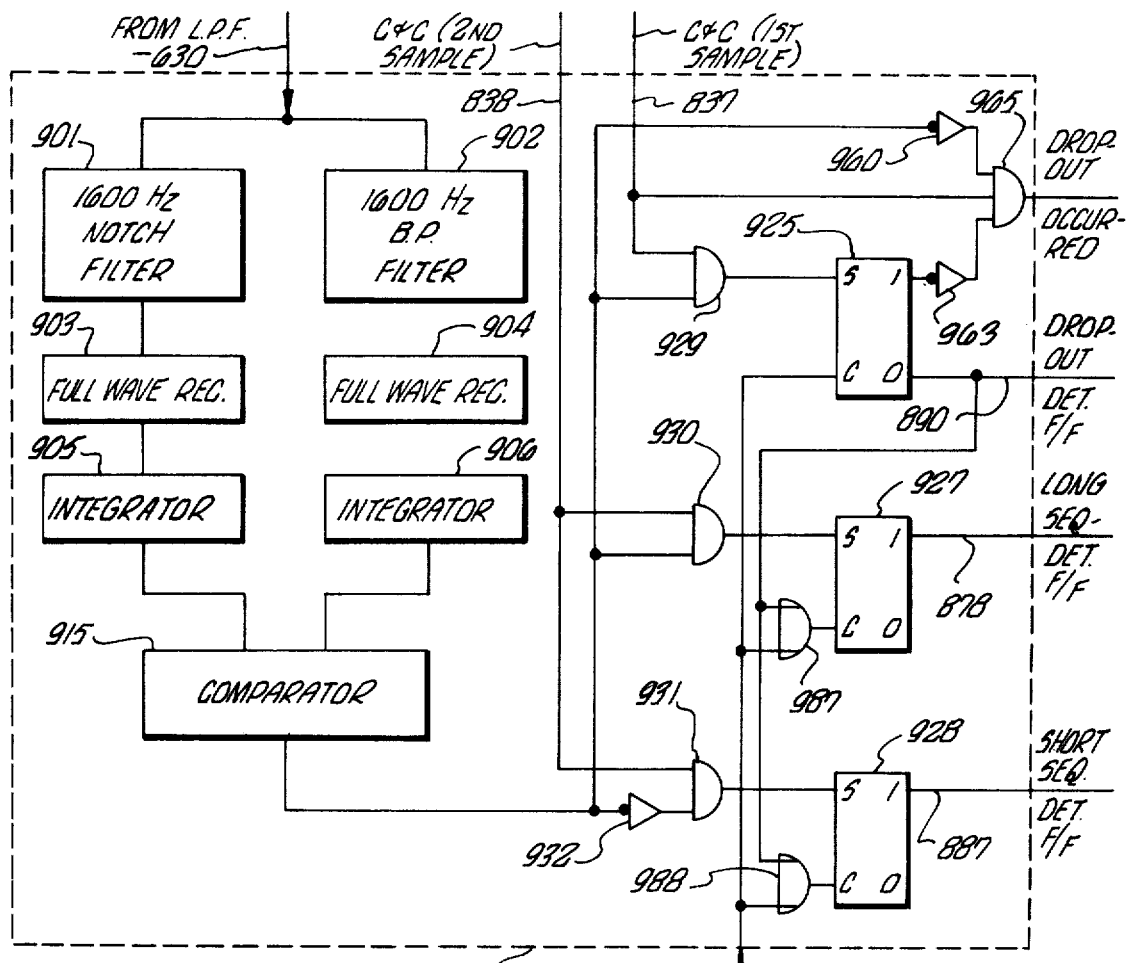
FIG. 9 is a more detailed block diagram of a clock and carrier detect 636 of FIG. 6.

FIG. 9 discloses the clock and carrier detector circuit 636 in more detail. As earlier described, detector circuit 636 is connected to the output of lowpass filter 630, FIG. 6. The output signal from lowpass filter signal 630 is a baseband signal which includes energy in the frequency spectrum of 0 through 1600 Hz. The baseband signal in detector 636 is separated into a first and a second monitoring channel. The first monitoring channel includes an in-series circuit comprising a 1600 Hz bandpass filter 902, a full wave rectifier 904, and an integrator 906. The second monitoring channel includes an in-series 1600 Hz notch filter 901, a full wave rectifier 903 and an integrator 905.

The two monitoring channels supply input signals to a comparator circuit 915. Comparator 915 is of any known type which is adapted to emit a true or high output signal when the first monitoring channel (elements 902, 904, and 906) emits an energy level in excess of the energy level from the second monitoring channel (elements 901, 903, and 905). Thus, when clock and carrier tones only are present, the first monitoring channel detects the 1600 Hz signal and has a high energy output supplied to comparator 915 as compared with the energy output from the second monitoring channel. An output signal from comparator 915 is applied as one input to AND gate 929. AND gate 929 receives as a second input the first sample pulse for clock and carrier tones which sample pulse is emitted on output lead 837, FIG. 8.

As previously described, if the output from comparator 915 is true at the first sample time, AND gate 929 is satisfied AND gate 929 emits a signal which sets a drop out detect F/F 925 to a 1 state. The 0 output at lead 890 removes the reset signal via OR gates 987 and 988 to a long sequence detect F/F 927 and a short sequence detect F/F 928, respectively. At this point, the receiver knows that a line drop out has not occurred by virtue of the true output at first sample time of the clock and carrier detector 636, and the presence of a 1 state for drop out detect F/F 925. A sequence is therefore being received, but the receiver does not yet know whether the sequence is long or short. Accordingly, a second sample pulse is supplied by gate matrix 824 on lead 838 at 32.5 ms. Recall that in a long sequence, the clock and carrier preamble is present for 35 ms., whereas in a short sequence, it is present for only 20 ms. This second sample pulse allows detector 636 to determine whether a short or long sequence is being received. The second sample pulse on lead 838 strobes AND gates 930 and 931. Note that AND gate 930 is driven by the normal output of comparator 915, but AND gate 931 is driven by the inverted output of 915 due to the action of inverter 932. For a short sequence at 32.5 ms., a three level signal is present, and the signal energy for data is considerably stronger than the energy present in the first monitoring channel of clock and carrier detect 636. In that event, the output of comparator 915 is false at the second sample time, thus satisfying AND gate 931 and setting the short sequence detects F/F 928 to a 1 while the long sequence detect F/F 927 remains at 0, since AND gate 930 was not satisfield. F/F 928, being in a 1 state, indicates a short sequence is being received.

For a long sequence at 32.5 ms., it can easily be seen that F/F 927 would be set to a 1 while F/F 928 would remain at 0. F/F 927, being in a 1 state, indicates a long sequence is being received.

In FIG. 8, the 878, 887, and 890 leads to clock and carrier detector circuit 636 are repeated. They supply signals to various logic elements which properly direct the equalizer action for the received signal.

An output of gate matrix 824 occurs at 20 ms. on lead 840 to set a fine equalize F/F 875 to a 1 state via OR gate 859. Equalizer 632 responds to the F/F 875 by drawing from memory 1275, FIG. 12, the previous constants obtained by the last data message, as well as enabling the fine equalization mode of the equalizer. As shown, loss of carrier or a coarse equalize condition resets the fine equalization F/F 875.

An output of gate matrix 824 occurs at 40 ms. on lead 839, and produces an enabling signal on the input leads to AND gates 885 and 854. If either a short sequence or line drop out is detected via input leads 887 or 890, respectively, one of the AND gates will emit an output signal which is gated via OR gate 858 into trailing edge detector 845, whose output trips a one-shot 870. An output from one-shot 870 resets the F/F 815 to a 0 state. OR gate 816 clears and pre-sets ring counter 825 via the 826 lead, and F/F 815 inhibits any further timer sequencing by disabling AND gate 823. Ring counter 825 is thus prepared for a subsequent timing sequence when a new carrier is detected. The output of one-shot 870 is also used to raise the DCD signal to the DTE and to set the RC F/F to a 1. This DCD signal also clears F/F 925, 927 and 928 shown in FIG. 9.

If a long sequence were detected via F/F 927, FIG. 9, then neither AND gate 885 or 854 would be enabled. Instead, AND gates 855 and 865 would be enabled via an enable signal on lead 878, FIG. 8. Between times 40 and 135 ms., an output signal on lead 841 from gate matrix 824 satisfies AND gate 855, whose output lead 843 does several things. First, it clears the fine equalize F/F 875 to a 0, removing the 1 state which was strobed in at 20 ms. via lead 840. Second, it clears from equalizer memory 1275 the previous constants obtained from the last data message, and replaces them with a set of initializing constants which in a known manner are selected as compromise values for typical telephone line characteristics. Third, the signal on output lead 843 of AND 855 is used to command equalizer 632 to accomplish a coarse equalization.

Figure 12:
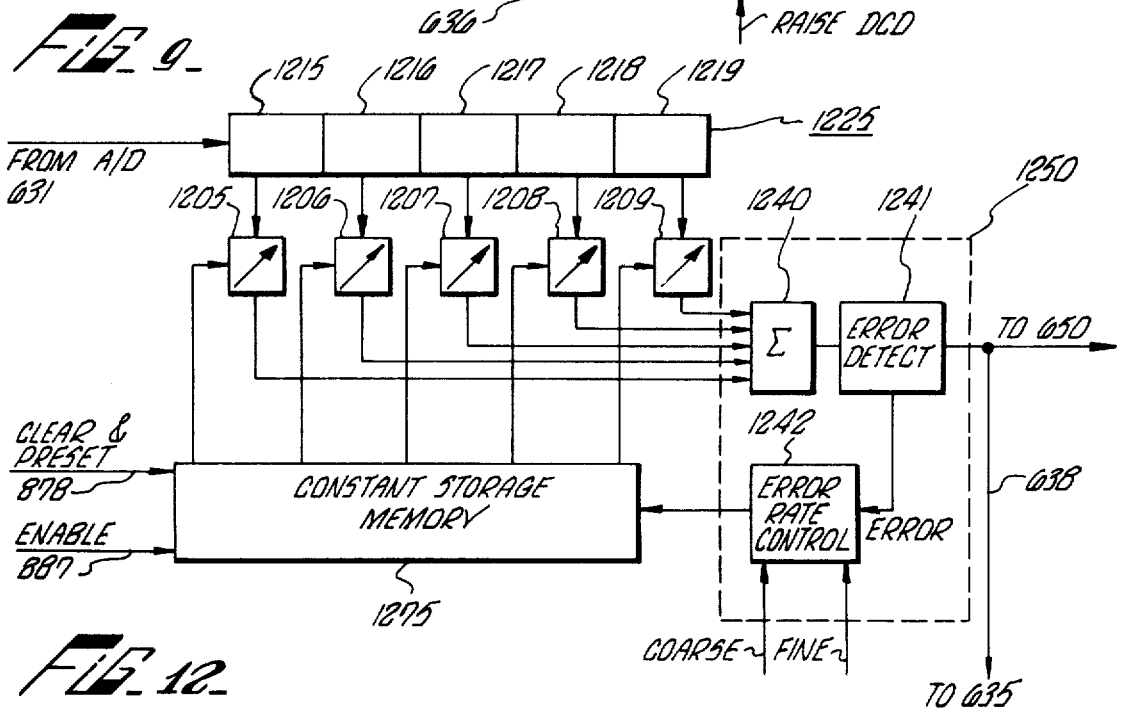
FIG. 12 is a more detailed block diagram of an automatic equalizer 632 of FIG. 6.

An automatic equalizer of a type well known in the art is shown in block form in FIG. 12. Although a time domain equalizer is depicted, the invention is not limited thereto. Equalizer 632 includes a plurality of tap attenuation adjustments 1205 through 1209. These attenuation adjustments are associated with delay or register stages 1215 through 1219 of equalizer delay line 1225. The positions or values of the attenuation settings are monitored by a summation circuit 1240 in error control circuit 1250. The feedback and error control 1250 may be any known type that detects errors in circuit 1241 and compensates by adjusting for those errors by signals stored in a memory 1275. In order to reduce equalizer time, an error rate control 1242 of any well known type is employed. In a coarse adjustment mode, the various attenuation settings of the automatic equalizer are moved in large amounts by large changes in the signals stored in memory 1275. A coarse command is applied by AND gate 885 to conventional error rate control 1242. This coarse adjustment by large signal variations in memory 1275 is conventional in automatic equalizers and need not be described in any greater detail.

For a fine equalizer adjustment, as is well known, the attenuation settings are changed in very small increments by the feedback control circuitry 1250. Thus, between 135 and 265 ms., AND gate 865, FIG. 8, is satisfied. Its output retriggers fine equalization F/F 875, FIG. 8 to the 1 state via OR gate 859. This condition on lead 876 causes the automatic equalizer error rate control 1242, FIG. 12, to assume a fine or slow adjustment during the time a three level pattern is present in the receive signal. During this portion of the long sequence, the attenuation settings 1205 through 1209 are fine tuned by signals stored in memory 1275 so that essentially all phase and delay distortion caused by the telephone line and other circuit disturbances is compensated for.

As the coarse and fine adjustment is taking place, constants (in analog or digital form) indicative of the position of the attenuation settings are stored within equalizer memory 1275. These constants are retained in memory 1275 in a well known fashion when loss of carrier ultimately occurs. Such constants are thus available to maintain the attenuator tap settings at the position they attained from the prior sequence. These memory constants, in response to an enable signal on lead 887, are used each time a new message is processed unless such constants are over-ridden by the clear and pre-set command on lead 878, at which time a new set of constants are derived, stored, and the described equalizer operation is again repeated.

Referring briefly to FIG. 8, the output of AND gate 865 also is gated via OR gate 858 so as to trigger the trailing edge detector 845 at about 265 ms. Detector 845 trips one-shot 870 at this time. The output of one-shot 870 causes the DCD to be raised, to set the RC F/F to a 1, to clear F/F 925, 927, and 928, as previously described in the short sequence/line drop out description. Of course, in the case of a short sequence, the RC F/F 125 is already in a 1 state and it is not affected by this further output from one-shot 870. In any event, as just described, the timing action at the conclusion of a short or long sequence is stopped so that further sequencing is inhibited. Ring counter 825 is thus properly conditioned for the next occurring sequence.

DROP OUT DETECTION

Because there is no master/slave relationship between modems, a further feature of this invention provides a means for automatically distinguishing when a line signal drop out has occurred at either modem.

Reference to FIG. 3 and 4 shows that 14 ms. after the wave front of energy starts receiver timer 155, a first sample for clock and carrier tones is made in the manner described earlier. The first clock and carrier sample will be true only if a long or a short sequence is being received. If the clock and carrier tones are absent, a drop out has occured.

Reference to FIG. 10 discloses how this distinguishing characteristic between a line drop out and a long or short sequence is employed for detection purposes. At time $t_0$ in FIG. 10, modem A receives RTS 1005. Assuming that EC F/F is in a 1 state, then transmitter 110 sends a short sequence 1010 prior to data message 1015. At time $t_3$ at the transmitter, CTS 1006 goes true and DTE "A" starts transmitting data message 1015.

At receiver 120 of modem B, at time $t_0$, CXR detect signal 1027 goes true when the wave of signal energy 1025 hits receiver 120. At time $t_3$, DCD 1030 goes true. As described earlier, DCD makes sure that flip flops 925, 927, and 928 of FIG. 9 are reset to a cleared or 0 state.

CXR detect 1027, at $t_0$, starts the receive sequence timer of FIG. 8 as earlier described. At 14 ms., a first sample occurs and clock and carrier tones are verified. At 32.5 ms., $t_2$, a second sample determines that clock and carrier tones are not present, thus verifying to receiver 120 that a short sequence 1010 was received. At time $t_3$, DCD goes true at receiver 120 and resets the receive sequence timer of FIG. 8 in the manner described earlier.

Assume, at time $t_5$, that a drop out 1035 occurs at the receiver due to a line disturbance. Such drop outs are typically of random duration and represent a total loss of line energy. Accordingly, CXR detect signal 1027 and DCD go false at time $t_5$. At some later time such as $t_6$, drop out 1035 terminates, and CXR detect 1027 goes true again. As noted earlier, every time CXR detect goes true, the receive sequence timer is re-started and the timing sequence is repeated. Accordingly, at the first sample time $t_7$, i.e. 14 ms. after CXR detect 1027 goes true, a first sample occurs. This time the first sample for clock and carrier tones by comparator 915, FIG. 9, is a false because a primary data message is being received.

Referring again briefly to FIG. 9, AND gate 929 is not enabled at time $t_7$ since comparator 915 emits a false signal. Thus, drop out detect F/F 925 remains in the 0 state which it assumed during the last sequence due to DCD being raised.

When the first sample, at time $t_7$, occurs the false output from comparator 915, FIG. 9, is inverted by inverter 960 and is applied as a true input to an AND gate 965. At sample time $t_7$, the cleared or 0 state of drop out F/F 925 is also present via inverter 963 to AND gate 965. Accordingly, AND gate 965 in this instance is satisfied and a drop out command is issued via AND gate 965. That command may be employed to light a panel light or other indicating device.

Of course, whether or not the data message 1015 with its errors due to the presence of drop out 1035 is to be used or not is up to the determination of the DTE. Thus, it is imperative in four wire operation that the normal modem operation continue recovering data. Thus, at time $t_7$, the 0 output of F/F 925 delivers an enabling pulse to AND gate 964 in FIG. 9. The output signal from gate 964 raises DCD and data recovery continues as though no drop out had occurred.

SIGNAL QUALITY MONITORING

As noted earlier, a feature of this invention is to increase data throughput by reducing dramatically the required equalization time once both receivers' equalizers have been completely equalized by a long equalization sequence. That feature is accomplished by automatically transmitting a short sequence before each data message. If such data messages were always of constant time duration, a suitable interval could be chosen for detecting whether good of bad signal quality is present in received data. However, the length of the data messages is a variable. In addition, data modems may also experience power interruptions which almost inevitably require complete re-equalization by a new long sequence. Experience has dictated that bad signal quality which exists for an interval of one second is critical. In such an instance, it is essential that a re-equalization sequence, i.e. a new long sequence be instigated by the modem receiver which detects this bad signal quality. The problem is compounded further because many signal messages are shorter than 1 second. It is thus essential that such short data messages also be monitored for good or bad data quality.

Figure 11:
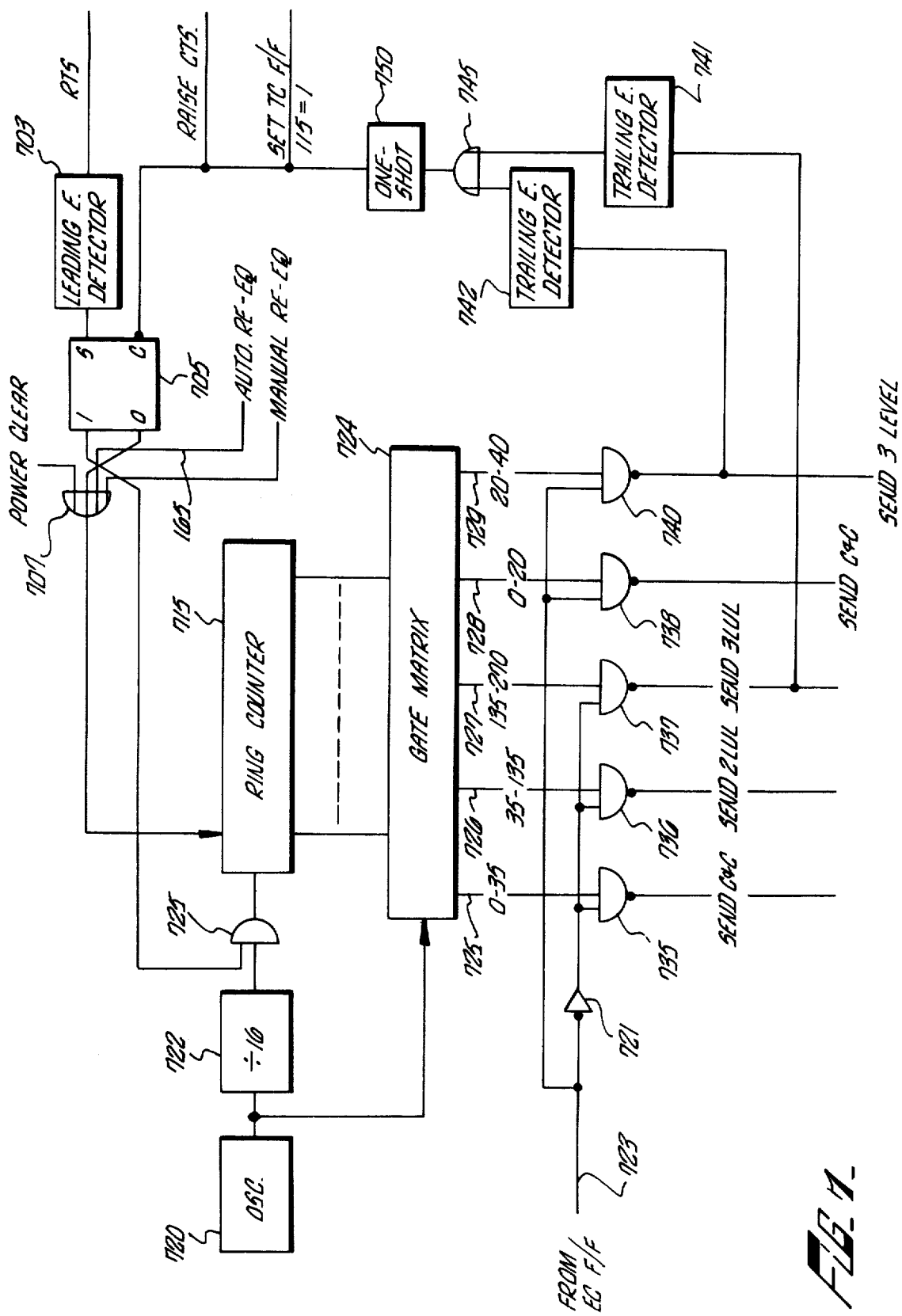
FIG. 11 is a more detailed block diagram of a signal quality monitor circuit 655 of FIG. 6.

A general description of signal quality monitor 635 is described in conjunction with FIGS. 11 and 11A. FIG. 11A is a waveform diagram showing good and bad signal quality limits as such would be emitted from an output of equalizer 632. Reference was made earlier to the U.S. Pat. No. 3,760,277. In that patent, three distinct levels are utilized for data. Thus, data may be a +Y value, a 0 value, or a −Y value for the Trits of the Trit pairs as earlier described. For purposes of description, assume that Y is ±1 volt. It is obvious, therefore, at 0.5Y an indeterminable condition exists. Thus, if the output of the equalizer 632 falls at or about +0.5Y, it is impossible to predict whether the true data value should be interpreted as a +1 or a 0. Similarly, at −0.5Y, the true data may either be a −1 or a 0. On the other hand, when the value of the equalizer output is greater than zero but much less that ±0.5Y, the chances are that the data output should be interpreted as a data zero.

Experience has shown that limits may be defined for valid interpretation of data values in a majority of cases. For example, good data falls within ±0.25 volts or greater than ±0.75 volts, as shown in FIG. 11A. The areas 1103 and 1104, shown shaded in FIG. 11A, represent questionable or bad data quality. These shaded areas are so close to the indeterminable position of ±0.5Y that it is difficult to predict with certainty exactly what the true data value interpretation should be. An equalizer data quality output lead 638, FIG. 6, monitors the equalized output from equalizer 632. For the example of this invention, data Trits are emitted from equalizer 632 at a rate of 3200 Hz. Therefore, in FIG. 11, clock source 1102 emits a clock signal at a rate of 3200 Hz. An input signal at lead 638, FIG. 11, is applied to a good data monitor circuit 1100 which comprises three one-shot multivibrators 1105, 1110 and 1115. These one-shots have reference value inputs which are associated with good data quality. Accordingly, circuit 1105 emits an output signal to AND gate 1106 if the data quality input is plus 0.75 or greater. In a similar manner, circuit 1110 emits an output signal to AND gate 1111 if the equalized data quality input signal is between ±0.25 volts. Circuit 1115 emits an output signal to AND gate 1116 if the equalized data quality signal is equal to or greater than −0.75 volts.

As described earlier for FIG. 11A, any time that the equalized Trits fall in the good data quality zones, then monitor circuit 1100 is satisfied and pulses representative of each good data Trit are emitted. In contradistinction, however, bad data quality is monitored by circuit 1101. Circuit 1101 has reference values at one-shots 1130 and 1135 that determine bad data quality. Thus, if the input signal on lead 638 falls within the indeterminable reference limits 1103 or 1104, FIG. 11A, one-shots 1130 and/or 1135 supplied a signal to AND gates 1131 and 1132.

Connected to the output of gates 1106, 1111, 1116 is a good data quality OR gate 1120. Connected to the outputs of AND gates 1131 and 1132 is a bad data quality OR gate 1125. Signal quality integrator 1175 is used to monitor the frequency of occurrence of outputs of OR gates 1120 and 1125 in a standard manner such that a majority of good data quality signals are required before 1175's output lead 1162, goes true. How many more good data quality signals vs bad data quality signals is a function of the design of the signal quality integrator 1175, which can be of any known design. For purposes of this application, suffice it to say that lead 1162 goes true when more good data quality signals occur than bad, and the time required for this to occur, if the system is functioning normally is quite short, i.e. if approximately 20 consecutive good data quality signals occur, lead 1162 goes true indicating good integrated signal quality.

For long data messages (exceeding 1 second in duration) timer 1168 in conjunction with OR gate 1190 is used to signal for a re-equalization. Timer 1168 is one of any well known design which is disabled from timing out when its input (lead 1162) is true. When input 1162 goes false, 1168 begins to time for its 1 second time-out. If input 1162 returns true at any time during the time-out period, in this case 1 second, then timer 1168 is reset producing no true output signal at output lead 1163. Thus, output lead 1163 goes true only if lead 1162 stays false for the entire time-out interval. After 1 second of continuous bad integrated signal quality timer 1168 signals for a re-equalization via OR gate 1190.

For short data messages, obviously timer 1168 cannot function. For short data messages, a new technique is required, which is the subject of this feature of our invention. Consider short message F/F 1186 and its associated AND gate in short message signal quality circuit 1185. When DCD goes high at the beginning of the data portion of data message transmission, leading edge detector 1123 is tripped, and its output signal sets F/F 1185 to a 1 state. This presents an alarm condition, which can be removed only if 1175 produces a true output on lead 1162, so as to clear F/F 1186. Since 1175 produces a true output only when recovered data quality is good, then after just a few good data bits are received in normal operation, F/F 1186 is cleared, and no re-equalization is commanded by circuit 1185.

However, if data quality is bad during a short message, then F/F 1186 remains at a 1 state, and when DCD goes low (indicating end of data transmission) trailing edge detector 1127 is tripped, enabling AND gate 1188 at that time. Since AND gate 1188 is satisfied under these conditions, then when 1188 is enabled its output commands a re-equalization via OR gate 1190.

Connected to the output of OR gate 1190 is an AND gate 1191 that is connected to a 50 ms. timer 1196. The re-equalization command, via AND gate 1191 and OR gate 1192 in four wire operation, starts timer 1195. During its entire 50 ms. time-out period a carrier squelch signal is applied on lead 1196. The re-equalization command also resets both the TC F/F and RC F/F to 0 states and drops RTS. When timer 1195 times out, carrier squelch is removed and an enabling signal is applied to OR gate 707 to start the transmit sequence timer so that a re-equalization sequence is initiated. The two wire re-equalization sequence is described in a later section.

RE-EQUALIZATION (i.e. NEW LONG SEQUENCE)

FIG. 2C depicts the operation involved when one modem, in this case assume modem A, decides that an automatic re-equalization is required in the manner just described in conjunction with FIG. 11. The purpose of monitoring circuit 635 is to immediately notify modem A that its own receiver 120 is consistently recovering bad data and that re-equalization is required.

Modem A's receiver 120 does not have any forward transmission capabilities to modem B's transmitter in order to allow modem A to notify modem B that modem A's receiver requires re-equalization. A feature of this invention overcomes that problem by modem A's signal quality monitor circuit 635 in its receiver immediately signalling a re-equalization command to transmit sequence control 150 in its transmitter. The re-equalization command is applied to OR gate 707, FIG. 7. The transmit sequence control (shown in detail in FIG. 7) responds to the re-equalization command by immediately dropping CTS to DTE "A", and initiating at transmitter 110 a re-equalization sequence which includes a 50 ms. carrier squelch followed by a long equalization sequence.

The timing involved in such a re-equalization sequence is depicted in FIG. 2C. As shown in FIG. 2C, modem A drops CTS and squelches its carrier to modem B beginning at time $t_{13}$. Carrier squelch signal 357 is held low for a 50 ms. time period. This time period is chosen to be sufficient to cause modem B's CXR detect to sense signal loss. In a four-wire/full-duplex mode, modem A can immediately interrupt DTE "A" even though DTE "A" has RTS 358 high and is supplying a data message to be sent to modem B. Accordingly, during the times $t_{13}$ through $t_{14}$, RTS 358 remains high. However, CTS is low. With CTS low, DTE "A" includes circuitry which recognizes that modem A is not accepting any further data for transmission. A different operation is involved for re-equalization in a two-wire/half-duplex mode as is described later. The 50 ms. time period provided by timer 1195, FIG. 11, for carrier squelch is of sufficient duration to exercise modem B's receiver at the remote end of the telephone line. By exercise, it is meant that modem A now knows that its own receiver 120 must be re-equalized, and A gets its own receiver re-equalized by sending a signal to modem B which requests re-equalization for modem A. The form of that re-equalization request signal, in accordance with a feature of this invention, is that modem A sends out its own long equalization sequence 359, FIG. 2C.

Modem B responds to carrier squelch 357 and, in the manner earlier described, detects that long equalization sequence 359 when it is expecting a short sequence. Accordingly, modem B knows that this unexpected long sequence is a request by modem A that modem B send a long equalization sequence back to modem A.

At modem B, in response to the forced absence of a line signal for 50 ms., CXR detect signal 375 and DCD 380 both drop low at time $t_{13}$. Modem B is still continuing to transmit data to modem A at this time because it is unaware that modem A's receiver required re-equalization. At time $t_{14}$, a new wave of energy in the form of long sequence 359 is again received at modem B and CXR detect 375 goes high. As earlier described, CXR detect going high starts a receive sequence timer in receive sequence control 260. The operation of modem B will now be described by reference to FIG. 5 and FIG. 8 even though those figures depict transmitter and receiver operation for modem A. In the following description, modem B circuit components are designated in parenthesis to enhance the understanding of the circuit operation.

At modem B, at time $t_{14}$, the timing sequence control F/F 815, FIG. 8, is set to a 1 state by CXR detect signal 375 going high. Ring counter 825 is enabled and the timing sequence described earlier commences. In this case, at modem B, clock and carrier tones are present at both sample times $t_{15}$ and $t_{16}$, FIG. 2C. This is an unexpected occurrence because EC F/F 235 is in a 1 state as shown by signal level 385, FIG. 2C.

In the manner earlier described, the long sequence F/F 927, FIG. 9, is set after both samples detect clock and carrier. The long sequence detect signal from F/F 927 is applied to an AND gate 131, FIG. 5. AND gate 131 is satisfied at time $t_{16}$ because EC F/F 135 (235 at modem B) is in a 1 state and a long sequence has been detected. An output from gate 131 causes one-shot 132 to emit a signal that clears TC F/F 115 (215 at modem B) in transmit control circuit 150 (260 at modem B). AND gate 151 also responds to the coincidence of a 0 state in TC F/F 115 (215 at modem B) and the output signal from one-shot 132 turns timer 152 "on" for a duration of 50 ms. This causes modem B at time $t_{16}$, FIG. 2C, to drop its line signal 370 to modem A.

Modem A's CXR detect is thus exercised in a manner similar to that earlier described. While timer 152 is on, an inhibit term is applied to inhibit gate 153 so as to lower CTS to DTE "B" as shown by signal 369 in FIG. 2C. As noted in FIG. 2C, TC F/F 215 at modem B is changed to a 0 state at time $t_{15}$, but RC F/F 225 maintains a 1 state. Accordingly, as shown in FIG. 5, and as described earlier, EC F/F 235 at modem B (135 in FIG. 5) goes to a 0 state whenever TC F/F 215 at modem B (115 in FIG. 5) is not in a 1 or whenever RC F/F 225 at modem B (125 in FIG. 5) is not in a 1 state.

Meanwhile, at modem A's transmitter 110, the long sequence is continuing, and modem B processes the signal until time $t_{17}$. At time $t_{17}$, CTS 361 to DTE "A" is re-raised. Note that, at modem B, its DCD 390 is also raised at approximately the same time.

At time $t_{16}$ +50 ms. (i.e. after carrier squelch) modem B's transmitter sends the required long re-equalization sequence 370 to modem A. It should be noted that although modem B's RTS 379 remains high throughout the re-equalization, modem B's CTS 369 is lowered at $t_{16}$ through $t_{18}$ indicating to DTE "B" that data cannot be accepted for transmission to modem A.

At time $t_{17}$, modem A's TC F/F 115 is set to a 1 as previously described, but its RC F/F 125 remains at a 0. Modem A is thus awaiting a sequence from modem B. Note that modem B started sending a long sequence at $t_{16}$ +50 ms. At $t_{18}$, modem A completes its re-equalization by using the long equalization sequence it received starting at $t_{16}$ +50 ms. The RC F/F 125 at modem A is set to a 1 as previously described, thus causing the EC F/F 135 to be set to a 1.

At modem B, at $t_{18}$, its TC F/F 215 is set to a 1 as previously described, and since its RC F/F 225 was never cleared, then EC F/F 235 is set to 1.

Thus, at $t_{18}$, both modem A and modem B are fully re-equalized by swapping long equalization sequences. Of course, the re-equalization operation could have been initiated manually by an operator or automatically at modem B rather than at modem A. In any event, however, the principle operation of this feature of out invention is identical to that just described.

TWO-WIRE/HALF-DUPLEX OPERATION

Certain basic differences exist between four-wire/full-duplex and two-wire/half-duplex operation. For example, in a two-wire/half-duplex operation, data can be transmitted in one direction only at a time. Because of this fact, only one DTE at a time can raise RTS and receive CTS from its associated modem. In the event that a modem is receiving a line signal CXR detect initiates DCD as earlier described. When such an event occurs in two wire operation, the DTE does not raise RTS because its modem is already receiving a signal from the modem at the opposite end. With this exception, the description of the manner in which long sequences and short sequences are sent and received is identical in a two wire mode as that previously described for a four wire mode. Stated in other words, in a four wire mode, it was previously described that both modems could be sending and receiving the equalization sequences and data irrespective of what the other modem was doing. Such is not the case in a two wire mode of operation.

In a two wire mode, if modem A has DCD false and DSR true, then modem A may raise its RTS. In response to that RTS, modem A in the manner previously described checks the status of its EC F/F and as necessary either sends out a long or a short equalization sequence as appropriate. That equalization sequence is followed by data. At the conclusion of a data message, the send carrier control circuit 525, FIG. 5, is operated to sequelch carrier because in two wire operation the carrier cannot be continuously on the line as it would interfere with data transmission from the modem at the other end.

In a four-wire/full-duplex operation, dedicated lines are involved. In a two-wire/half-duplex operation, the connections are made through a DDD network. The manner in which a telephone line is connected between modem A and modem B for a two-wire/half-duplex operation is fully described in the patent application assigned to the same assignee as the present application filed concurrently herewith and entitled Data Modem Having Line Verification and Automatic Disconnect Features, listing Charles W. Roedel and Richard Borysiewicz as inventors.

In that application reference is made to U.S. Pat. No. 3,783,194. The co-filed patent application and this issued Pat. No. 3,783,194 together fully described the operation involved in verifying that a telephone line with echo suppressors disabled exists for modems operating in a two wire mode. Because only one modem at a time is allowed to transmit data to the other modem, a basic difference is involved when the signal quality monitor circuit 635 determines that the receiver requires re-equalization. The modem which requires re-equalization cannot immediately take control away from the DTE and send a long sequence for re-equalization. Instead, the re-equalization command is stored for a two wire re-equalize sequence.

Reference to FIG. 11 shows that a re-equalization command from OR gate 1190, in two wire operation, enables AND gate 1150 which in turn sets a two wire re-equalize flip flop 1155 to a 1 state. That re-equalize command is held in F/F 1155 until DCD drops low. When DCD drops, inverter 1156 supplies an enabling signal to AND gate 1157 and via OR gate 1192 the 50 ms. carrier squelch timer is again pulsed and the re-equalization operation as earlier described is repeated.

ECHO GUARD IN TWO-WIRE/HALF-DUPLEX

Another difference exists in comparing four-wire/-full-duplex and two-wire/half-duplex because of the basic difference in communication links. In a two wire operation as fully described in the co-filed application and the referenced U.S. Pat. No. 3,783,194, the echo suppressors are disabled in DDD network between communicating modems. With echo suppressors disabled a data message, due to imbalance in hybrids, will be reflected around the network and back again. Accordingly, if a data message transmitted to modem B ends, that message is reflected to modem A and is further reflected back to modem B. We have discovered that this reflected message may be treated in the same manner as a line drop out in the four wire operation. Thus, when the reflected message appears, the drop out F/F 925 emits an enabling signal to AND gate 882, which gate in turn inhibits gate 823 to stop any further counter operation and at the same time clears and pre-sets counter 825 via OR gate 827. This operation shuts down the receiver and DCD is not raised. Accordingly, the modem awaits further commands from its DTE. If the echo guard technique were not employed, data throughput would obviously reduced.

It is to be understood that the foregoing features and principles of this invention are merely descriptive, and that many departures and variations thereof are possible by those skilled in the art, without departing from the spirit and scope of this ivention.

What is claimed is:

1. In a data communication system having first and second four-wire/full-duplex data modems communicating by data line signals over a telephone line, the line characterized in that data message transmission is interrupted by randomly occurring line drop outs in the data message portion of the line signal, the combination comprising:
    means at the transmitter of the first modem for transmitting line signals comprising individual data messages preceded by a unique signal;
    means at the receiver of said second modem for receiving line signals transmitted over the telephone lines;
    means at said receiver for detecting the absence of a line signal;
    means responsive to said detecting means when a line signal re-appears at said receiver for sampling for the presence of said unique signal; and
    means responsive to said sampling means for indicating a line drop out occurred due to the absence of said unique signal at said sampling means.

2. In a data communication system having first and second two-wire/half-duplex data modems communicating by data line signals over a telephone line, the line characterized in that data message transmission upon termination is characterized by an echo of the data message being reflected to the receiver, the combination comprising:
    means at the transmitter of the first modem for transmitting line signals comprising individual data messages preceded by a unique signal;
    means at the receiver of said second modem for receiving line signals transmitted over the telephone lines;
    means at said receiver for detecting the absence of a line signal at the end of a data message;
    means responsive to said detecting means when a line signal re-appears at said receiver for sampling for the presence of said unique signal; and means responsive to said sampling means for indicating an echo has appeared due to the absence of said unique signal.

3. In a data communication system having first and second modems capable of communicating by line signals over telephone lines, the improvement comprising:
- means at the transmitter of a first modem for transmitting line signals comprising data message signals preceded by a tone signal;
- means at the receiver of the second modem for receiving said line signals;
- means at said receiver responsive to the absence and reappearance of said line signals for sampling the reappeared line signal for the presence of said tone signal; and
- means at said receiver responsive to said sampling means for emitting a line drop out indicating signal.

4. In the data communication system of claim 3 wherein the second modem further comprises:
- means at the receiver for detecting the absence of said line signal;
- means at the receiver responsive to the appearance of the line signal for emitting a timing command to operate said sampling means.

5. In the data communication system of claim 4 wherein the second modem further comprises:
- means at said sampling means responsive to said timing command for initiating a sample of the line signal during a predetermined time interval designated for said tone signal.

6. In the data communication system of claim 3 wherein said data message signal is a carrier signal modulated with binary data and said tone signal is characterized by being distinguishable from said modulated carrier signal, and said means for emitting said indicating signal comprises:
- a comparator device normally set in a first state; and
- means responsive to the absence of said tone signal at the sampling time for setting said comparator to a second state.

7. In a communication system having first and second modems capable of communicating by line signals over telephone lines, said modems operating over said telephone lines in a two wire half duplex mode, the improvement comprising:
- means at the transmitter of a first modem for transmitting line signals comprising data message signals preceded by a tone signal;
- means at the receiver of the second modem for receiving said line signals;
- means at said receiver responsive to the absence and reappearance of said line signals for sampling the reappeared line signal for the presence of said tone signal; and
- means at said receiver responsive to said sampling means for emitting a reflected data-indicating signal.

* * * * *